US007710962B2

(12) United States Patent
Kodama et al.

(10) Patent No.: US 7,710,962 B2
(45) Date of Patent: May 4, 2010

(54) PACKET FORWARDING APPARATUS AND METHOD FOR MULTICAST PACKETS

(75) Inventors: Yasuhiro Kodama, Yokohama (JP); Kazuo Sugai, Hadano (JP); Shinichi Akahane, Hachioji (JP); Hiroki Yano, Ebina (JP); Kaoru Okano, Ebina (JP); Naoya Kumita, Yokohama (JP)

(73) Assignee: Alaxala Networks Corporation, Kanagawa (JP)

( * ) Notice: Subject to any disclaimer, the term of this patent is extended or adjusted under 35 U.S.C. 154(b) by 960 days.

(21) Appl. No.: 11/387,810

(22) Filed: Mar. 24, 2006

(65) Prior Publication Data

US 2007/0133531 A1    Jun. 14, 2007

(30) Foreign Application Priority Data

Dec. 14, 2005    (JP)    ............................. 2005-360502

(51) Int. Cl.
*H04L 12/28*    (2006.01)
*H04L 12/56*    (2006.01)

(52) U.S. Cl. .................. 370/390; 370/394; 370/395.31; 370/395.4; 370/395.41

(58) Field of Classification Search ................. 370/390, 370/395.31, 394, 395.4, 395.41, 230.1
See application file for complete search history.

(56) References Cited

U.S. PATENT DOCUMENTS

| 6,075,814 A * | 6/2000 | Yamano et al. ............. 375/222 |
| 6,452,915 B1 * | 9/2002 | Jorgensen .................. 370/338 |
| 6,515,991 B1 * | 2/2003 | McKeown .................. 370/390 |
| 6,944,170 B2 * | 9/2005 | Minkenberg ................ 370/411 |
| 7,310,348 B2 * | 12/2007 | Trinh et al. ................. 370/428 |
| 7,477,599 B2 * | 1/2009 | Lee et al. ................. 370/230.1 |
| 2002/0196778 A1 * | 12/2002 | Colmant et al. ............. 370/352 |
| 2003/0165148 A1 * | 9/2003 | Bishard ..................... 370/412 |
| 2004/0017810 A1 * | 1/2004 | Anderson et al. ........... 370/390 |

FOREIGN PATENT DOCUMENTS

| JP | 2000-31983 | 1/2000 |
| JP | 2005-269314 A | 9/2005 |

* cited by examiner

*Primary Examiner*—Dang T Ton
*Assistant Examiner*—Frederick Ott
(74) *Attorney, Agent, or Firm*—Mattingly, Malur, P.C.

(57) ABSTRACT

The present invention provides a technology for processing packets, such as VoIP packets, with priority. A priority-designating unit designates priority information based on header information. A pointer searching unit refers to a pointer table to obtain pointer information corresponding to a destination address. A sorting unit sorts the pointer information into a high-priority queue and a low-priority queue according to the priority information. A next queue holds pointer information obtained from a destination information table. A scheduler extracts and outputs the pointer information from each queue in the following order of priority: the next queue, a high-priority queue, and a low-priority queue. A destination-information-table searching unit obtains destination information and/or the pointer information from the destination information table based on the pointer information, and outputs the destination information to a packet forwarding and duplicating unit and outputs the pointer information to the next queue.

16 Claims, 18 Drawing Sheets

(a) FORMAT

| OUTPUT PORT 0 | OUTPUT PORT 1 | ... | OUTPUT PORT m |
|---|---|---|---|
| NEXT-HOP IP ADDRESS ||||

(b) UNICAST EXAMPLE (OUTPUT PORT NO. 1, NEXT-HOP IP ADDRESS 192.168.0.2)

| OUTPUT PORT 0 | OUTPUT PORT 1 | ... | OUTPUT PORT m |
|---|---|---|---|
| '0' | '1' | | '0' |
| NEXT-HOP IP ADDRESS "192. 168. 0. 2" ||||

(c) MULTICAST EXAMPLE (OUTPUT PORT NOS. 0, 1, 6)

| OUTPUT PORT 0 | OUTPUT PORT 1 | ... | OUTPUT PORT 6 | ... | OUTPUT PORT m |
|---|---|---|---|---|---|
| '1' | '1' | | '1' | | '0' |
| NEXT-HOP IP ADDRESS Don't care ||||||

FIG. 15

(a) FORMAT

| END-OF-DESTINATION-INFORMATION IDENTIFIER | OUTPUT PORT NUMBER |
|---|---|
| NEXT-HOP IP ADDRESS (WHEN END-OF-DESTINATION-INFORMATION IDENTIFIER = "1") / NEXT POINTER (WHEN END-OF-DESTINATION-INFORMATION IDENTIFIER = "0") | |

(b) UNICAST EXAMPLE (OUTPUT PORT NO. 1, NEXT-HOP IP ADDRESS 192.168.0.2)

A →

| END-OF-DESTINATION-INFORMATION IDENTIFIER "1" | OUTPUT PORT NUMBER "1" |
|---|---|
| NEXT-HOP IP ADDRESS "192. 168. 0. 2" | |

(c) MULTICAST EXAMPLE (OUTPUT PORT NOS. 0, 1, 6)

B →

| END-OF-DESTINATION-INFORMATION IDENTIFIER "0" | OUTPUT PORT NUMBER "0" |
|---|---|
| NEXT POINTER 1 | |

| END-OF-DESTINATION-INFORMATION IDENTIFIER "0" | OUTPUT PORT NUMBER "1" |
|---|---|
| NEXT POINTER 2 | |

| END-OF-DESTINATION-INFORMATION IDENTIFIER "1" | OUTPUT PORT NUMBER "6" |
|---|---|
| Don't care | |

FIG. 16

PACKET FORWARDING APPARATUS AND METHOD FOR MULTICAST PACKETS

The present application claims priority from Japanese patent application JP2005-360502 filed on Dec. 14, 2005, the content of which is hereby incorporated by reference into this application.

BACKGROUND OF THE INVENTION

The present invention relates to packet forwarding apparatuses and multicast expansion methods. Multicast expansion means searching for a plurality of destinations for a single multicast packet. The packet is duplicated for each of the plurality of destinations found. Then, the duplicated packets, which have the same contents, are distributed.

Services provided over IP networks, such as video distribution and voice-over-IP (VoIP) telephony, in which real-time performance is critical, are becoming more and more popular, and there are increasing demands to improve the quality of such services. In order to improve VoIP quality and multicast processing performance to realize efficient video distribution, quality-of-service (QoS) control is becoming increasingly important in routers and switches for reducing delay fluctuations. In order to reduce costs, for example, there are demands for an increased number of interfaces or users that can be accommodated by a single router or switch. Also, in order to support high-volume data communication such as video distribution services, there are demands to provide high-speed lines in routers and switches to achieve wire-rate processing.

A technology has been developed for realizing efficient multicast processing that has no input-bandwidth restriction, by performing one-time readout of a destination information table in multicast processing to finish multicast processing in the same cycle as unicast processing (for example, see FIG. 3 in Japanese Unexamined Patent Application Publication No. 2000-31983).

SUMMARY OF THE INVENTION

By increasing the number of interfaces accommodated in a single apparatus, the number of bits required for the destination information table increases. Increasing the number of bits and the speed of the lines means that accesses to the destination information table do not fall within the required processing cycles. In addition, during multicast processing, there are cases where it is necessary to read the destination information table multiple times, in proportion to the number of expansions (the number of users accommodated).

Since unicast processing is suspended during multicast expansion processing, it may not be possible to interrupt the multicast expansion processing. Even if there are priority packets to be processed, their processing must be postponed while the multicast expansion processing is being carried out. For example, in the event of simultaneous multicasting with a large number of expansions, the delay fluctuation of VoIP packets, for which real-time performance is critical, increases, and they may be discarded if the reception buffer capacity is low.

Therefore, a packet forwarding apparatus and a multicast expansion method that can process priority packets, such as VoIP packets, according to their priority, even when multicast expansion is being simultaneously carried out, have been investigated. The possibility of setting a ratio with which high-priority packets and low-priority packets are extracted from queues, and processing of the packets with this ratio have been investigated. Also, processing of a high-priority flow, which is given priority over other flows, has been studied, even for a case where multicast expansion processing is simultaneously carried out and the next destination search is postponed during multicast expansion.

Also, the possibility of providing high-speed lines and increasing the number of interfaces accommodated has been considered. In addition, giving high priority to VoIP packets, for which real-time performance is critical, preventing VoIP packets from being discarded, and reducing the delay fluctuation has also been studied, even though the reception buffer capacity is small and multicast processing with a high number of expansions is simultaneously carried out. Efficiently accommodating multicast and VoIP packets has also been studied.

In light of the situation described above, in the present invention, separate queues are provided for multicast packets and VoIP packets at a stage before the destination information table is read, which typically forms a processing bottleneck during multicast processing. With this configuration, even though multicast expansion processing is being carried out simultaneously, it is possible to process the VoIP packets with priority.

Flow detection is performed before carrying out the destination search (before reading the destination table), and a priority is designated for each flow. A first-pointer queue is provided for each priority, and then the destination table is read according to the priority. By doing so, even though multicast expansion processing is simultaneously being carried out and the next destination search is postponed during multicast expansion, it is possible to process a high-priority flow which is given priority over other flows. Although priority control according to the output bandwidth, using a transmission control unit, is known in the related art, priority control is carried out before reading the destination information table for destination searching in the present invention.

In a first aspect of the invention, once low-priority multicast expansion begins, processing of high-priority packets is stopped until that expansion is completed. In a second aspect of the invention, even a next-pointer queue is provided for each priority, and then, the destination table is read. Therefore, it is possible to process high-priority packets with priority, even during low-priority multicast expansion.

According to the present invention, it is possible to provide a packet forwarding apparatus and multicast expansion method which can process high-priority packets, such as VoIP packets, with priority even when multicast expansion is being carried out simultaneously. In addition, according to the present invention, it is possible to set a ratio with which high-priority packets and low-priority packets are extracted from queues, and the packets can be processed with this ratio. According to the present invention, even when multicast expansion processing is simultaneously being carried out and the next destination searching is postponed during multicast expansion, it is possible to process a high-priority flow, which is given priority over other flows.

Furthermore, according to the present invention, it is possible to provide high-speed lines and to increase the number of interfaces accommodated. In addition, even though many reception buffers are not provided and multicast processing with a high number of expansions is simultaneously carried out, VoIP packets, for which real-time performance is critical, can be given high priority, and it is thus possible to prevent VoIP packets from being discarded and to reduce delay fluctuation. According to the present invention, it is also possible to efficiently handle multicast packets and VoIP packets.

BRIEF DESCRIPTION OF THE DRAWINGS

FIGS. 15A to 15C are diagrams showing example formats of a conventional one-time readout destination information table.

FIGS. 16A to 16C are diagrams showing example formats of a multiple-readout destination information table.

DESCRIPTION OF THE PREFERRED EMBODIMENTS

1. First Embodiment

1.1 Configuration of Apparatus

Figure 1:
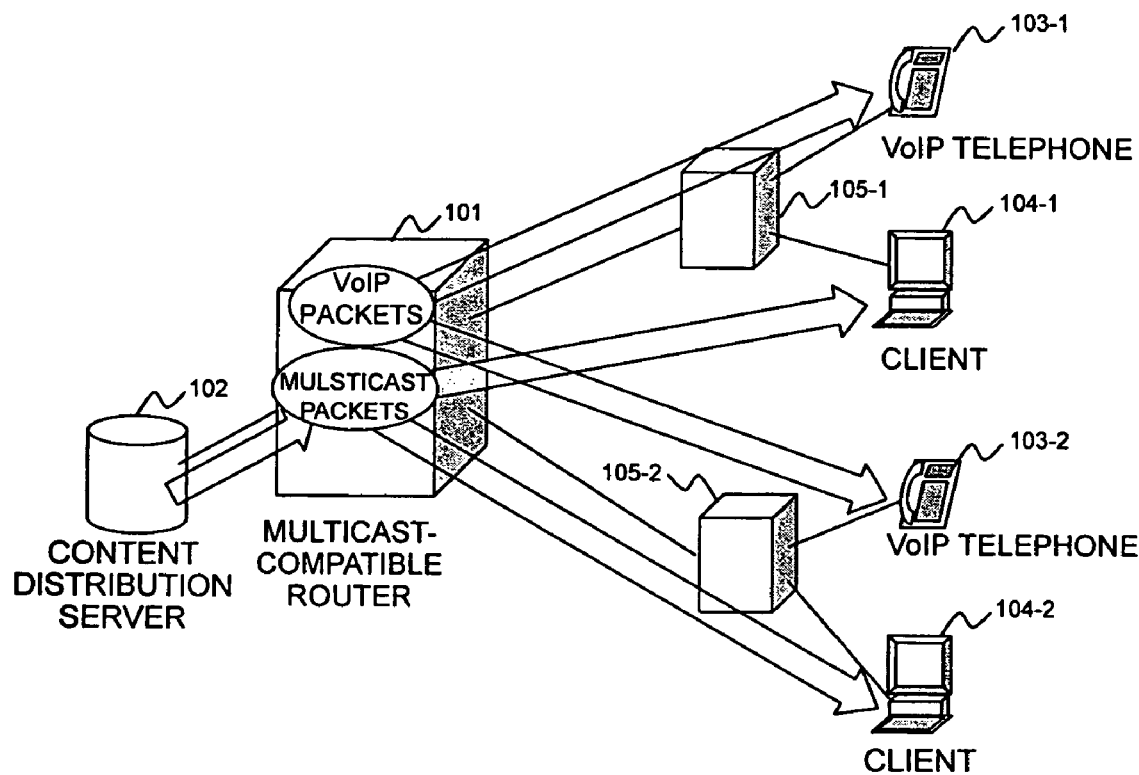
FIG. 1 is a diagram showing an example network configuration using a multicasting router.

FIG. 1 shows the configuration of a network using a multicast router. This network includes, for example, a router (packet forwarding apparatus) 101, a content distribution server 102, voice-over-IP (VoIP) telephone devices 103, client terminals 104, and relay devices 105.

The router 101 forwards packets, including VoIP packets and multicast packets. The content distribution server 102 distributes multicast packets, for example. A VoIP telephone device 103-1 performs voice communication with another VoIP telephone device 103-2 or client terminal 104 via VoIP. The client terminals 104 receive, for example, multicast packets from the content distribution server 102. The relay devices 105 relay packets between the router 101 and the VoIP telephone devices 103 and client terminals 104.

Example of One-Time Readout

First, a case will be described in which a destination information table is read only once, like the conventional case, to obtain all destination information in a single access, even for multicasting. Each configuration is described in association with the present embodiment merely for the sake of convenience, and the configuration is not intended to specify prior art.

Figure 2:
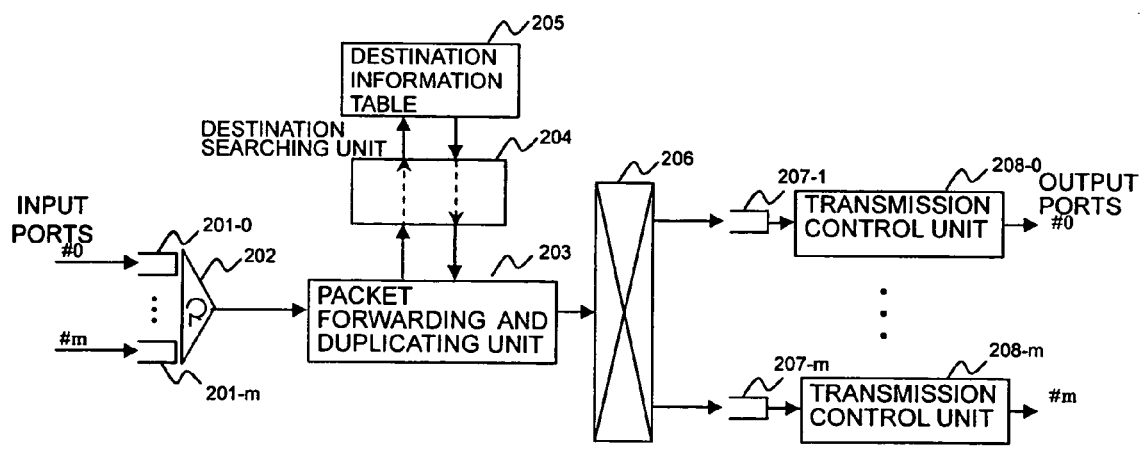
FIG. 2 is a diagram showing an example configuration of a conventional router carrying out one-time, batch readout of a multicast destination table.

FIG. 2 shows an example configuration of the router, which collectively reads information from the destination information table in a single step.

Reception queues 201-0 to 201-m are waiting queues for holding received packet information from corresponding input ports #0 to #m. Each reception queue 201 outputs an extraction request to a round-robin scheduler 202, and packets are extracted in a sequence determined by the round-robin scheduler 202. The round-robin scheduler 202 sequentially extracts packets from the queues in response to the extraction requests from the reception queues 201, which correspond to the input ports, and the extraction of packets from the queues is controlled so as to be uniform.

A packet forwarding and duplicating unit 203 outputs a destination-search request to a destination searching unit 204 and forwards a packet to a switch 206 based on the search result from the destination searching unit 204. The search request includes, for example, packet header information, and the search result includes destination information. In the case of multicasting, the packet forwarding and duplicating unit 203 duplicates the packet according to a plurality of destination information items sent from the destination searching unit 204, and forwards the duplicated packets to the switch 206.

In the one-time readout method, a destination information table 205 stores output-port information and a next-hop IP address as the destination information. During multicasting, it stores a plurality of destination information items.

FIGS. 15A to 15C show example formats of the destination information table 205 in the conventional one-time readout method. As shown in FIG. 15A, the destination information table 205 includes, for example, output-port information and a next-hop IP address. The output-port information is, for example, a plurality of flags corresponding to the output ports. In the example shown in the figure, a digit "1" for each port indicates an output to the corresponding port, and a digit "0" indicates that there is no output. FIG. 15B shows an example for a unicast packet. In this example, the flag for output port 1 is "1", and the next-hop IP address is "192.168.0.2". FIG. 15C is an example for a multicast packet. In this example, as the distribution destinations of the multicast packet, the flags corresponding to output ports 0, 1, and 6 are "1", and the next-hop IP address is "Don't care". This multicast packet is thus duplicated and each output from the output ports 0, 1, and 6.

In FIG. 2, the destination searching unit 204, which performs one-time readout from the destination table, performs a single search of the destination information table 205 according to a search request from the packet forwarding and duplicating unit 203 and outputs the search result to the packet forwarding and duplicating unit 203. For example, the destination searching unit 204 reads out the output-port information and next-hop IP address simultaneously based on the header information included in the search request. For instance, in the example of the destination information table 205 shown in FIG. 15B, the flags "0, 1, . . . , 0" corresponding to the output ports 0 to m and the next-hop IP address "192.168.0.2" are read out simultaneously. Similarly, this also applies to the multicast example shown in FIG. 15C. Then, the output-port information and the next-hop IP address that are read out are output to the packet forwarding and duplicating unit 203 as the search result.

The switch 206 switches a packet forwarded from the packet forwarding and duplicating unit 203 to a transmission queue 207 corresponding to the output port, based on the output-port information.

The transmission queues 207-0 to 207-m are waiting queues for holding transmission packet information from the switch 206. Each transmission queue 207 outputs an extraction request to a transmission control unit 208, and extraction is performed at a timing determined by the transmission control unit 208.

The transmission control units 208-0 to 208-m extract transmission packets from the transmission queues 207 according to the output port bandwidth and output the packets from output ports #0 to #m. Conventional quality-of-service (QoS) control is performed at this stage.

Figure 3:
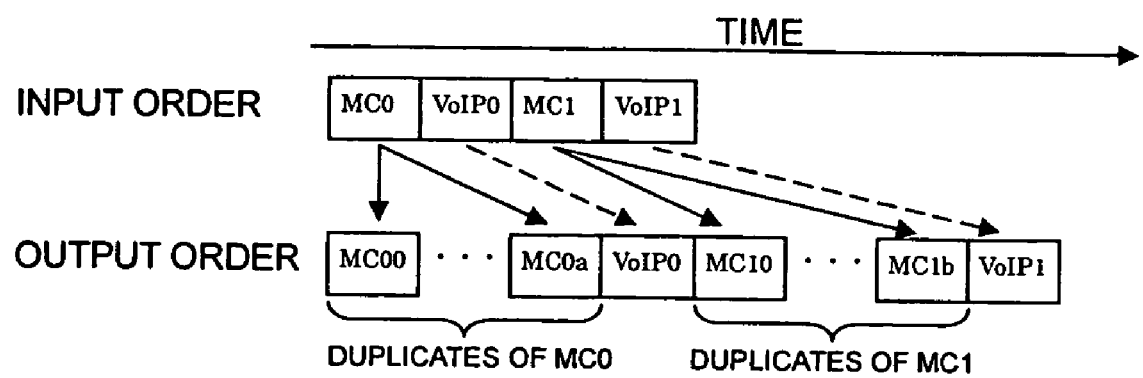
FIG. 3 is a diagram showing the output sequence of packets from the apparatus shown in FIG. 2, for input multicast and VoIP packets.

FIG. 3 shows the output sequence of multicast and VoIP packets input to the apparatus shown in FIG. 2. For example, when packets are input to the router shown in FIG. 2 in the sequence of multicast packet (hereinafter abbreviated as MC) 0, VoIP packet (hereinafter abbreviated as VoIP) 0, MC1, and VoIP1, the packets MC0 and MC1 are each duplicated, and the duplicates, VoIP0, and VoIP1 are output in the same order as the input order. Here, if the number of multicast expansions is high, the delay time of VoIP1, for example, becomes long.

Multiple-Readout Configuration

Figure 4:
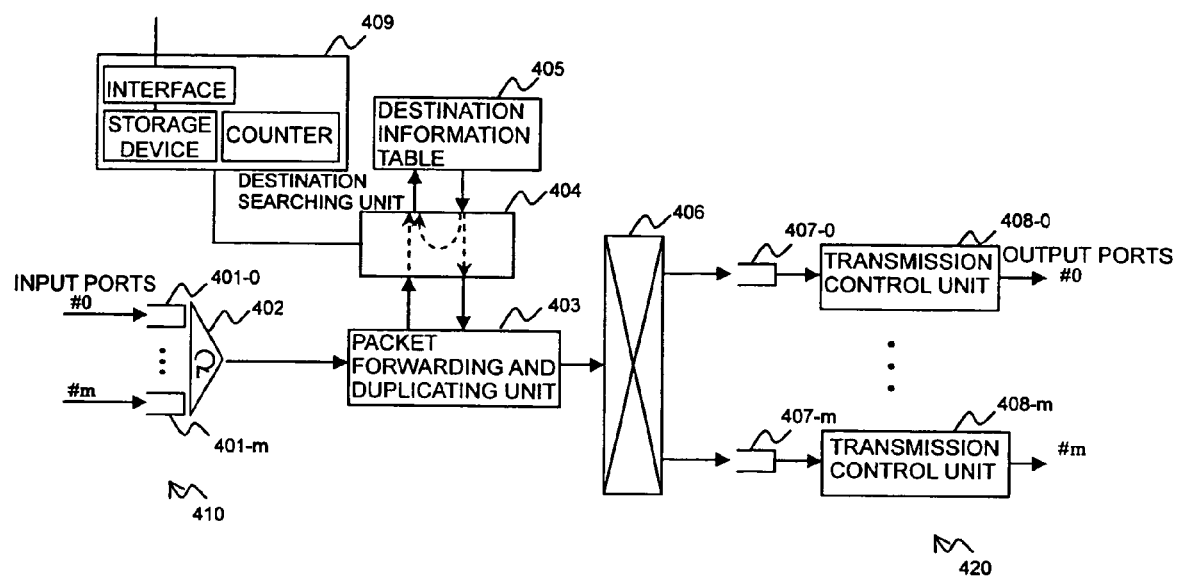
FIG. 4 is a diagram showing an example of the configuration of a router which carries out multiple-readout of a destination table in multicasting.

FIG. 4 shows an example configuration of the router 101 according to the present embodiment, which performs multiple readout of a multicast destination table.

The router 101 includes an input unit 410, a packet forwarding and duplicating unit 403, a destination searching unit 404, a destination information table 405, a switch 406, and an output unit 420. The input unit 410 includes, for example, reception queues 401 corresponding to input ports and a round-robin scheduler 402. The output unit 420 includes, for example, transmission queues 407 and transmission control units 408 corresponding to output ports. The router 101 may also include a scheduling setting unit 409.

Unicast packets and multicast packets are input to the input unit 410. The destination searching unit 404 specifies priority levels based on header information in the packets input via the input unit 410, performs a single search or multiple searches in the destination information table 405 in a sequence according to the priority levels, and obtains one or a plurality of output-port information items and/or next-hop IP addresses.

The packet forwarding and duplicating unit 403 outputs the input unicast packets according to the destination information including the output-port information and the next-hop IP address obtained by the destination searching unit 404. In addition, it also duplicates and outputs the input multicast packets according to the destination information including the plurality of output-port information items obtained by the destination searching unit 404. The switch 406 switches the unicast packets and the multicast packets sent from the packet forwarding and duplicating unit 403 based on the destination information. The output unit 420 then outputs the switched packets.

The scheduling setting unit 409 includes, for example, a storage device, an interface, and a counter. For example, using a command line interface (CLI), a ratio for weighted fair queuing (WFQ), described later, are set in the storage device. A scheduling-mode setting is specified which indicates whether to execute full-priority scheduling control or WFQ scheduling control, which are described later, for extraction from high-priority queues and low-priority queues. The counter includes a high-priority counter and a low-priority counter. When the high-priority counter extracts pointer information from a high-priority queue 505-1, it accumulates a high-priority weight setting corresponding to the ratio described above. Likewise, when the low-priority counter extracts pointer information from a low-priority queue 505-2, it accumulates a low-priority weight setting corresponding to the ratio described above. The value in each counter may be initially set to 0, for example.

In the multiple-readout method, the destination information table 405 stores output-port information and a next-hop IP address as the destination information. In addition, in order to store a plurality of destination information items for multicasting, it stores a pointer to a next destination information table and an end-of-destination-information identifier.

FIGS. 16A to 16C show example formats of the destination information table 405 in the multiple-readout method in the present embodiment.

As shown in FIG. 16A, the destination information table 405 includes, for example, an end-of-destination-information identifier, output-port information, and either a next-hop IP address or a next pointer (second pointer information), correspondingly to pointer information. The output-port information can be an output port number, but it need not be a number; for example, it may be any other type of identification information, such as a text string. Likewise, the next-hop IP address need not be an IP address; it may be a MAC address or the like, or it may be an IP address and MAC address pair. The end-of-destination-information identifier indicates whether or not there is additional destination information to be searched next. For example, for a unicast packet, there is one output port, and the end-of-destination-information identifier is set to "1". For a multicast packet, when there is a next pointer for obtaining another destination information item, the end-of-destination-information identifier is set to "0". Conversely, when there is no next pointer, that is, when there is no further destination information, the end-of-destination-information pointer is set to "1".

FIG. 16B shows an example format for a unicast packet. For a unicast packet, the destination information table 405 includes an end-of-destination-information identifier of "1", output-port information (for example, port number 1), and a next-hop IP address (for example, 192.168.0.2). The example shown is referred to when the pointer information is A, for instance.

FIG. 16C is an example format for a multicast packet. For a multicast packet, the destination information table 405 includes an end-of-destination-information identifier, one output-port information item for outputting the multicast packet, and a next-hop pointer to be referred to next. In the example shown in FIG. 16C, the multicast packet is output to output port numbers 0, 1, and 6. First, an end-of-destination-information identifier "0", the output port number "0", and a next pointer 1 are stored correspondingly to pointer information B, (upper part of FIG. 16C). Next, an end-of-destination-information identifier "0", an output port number "1", and a next pointer 2 are stored correspondingly to the next pointer 1, (middle part of FIG. 16C). Then, an end-of-destination-information identifier "1" and an output port number "6" are stored correspondingly to the next pointer 2, (lower part of FIG. 16C). In the multicasting case, the destination information table is read multiple times according to the first-pointer information and the next-pointer information. Then, when the end-of-destination-information identifier is "1", indicating that there is no next pointer, the search for destination information for the multicast packet is completed.

Figure 5:
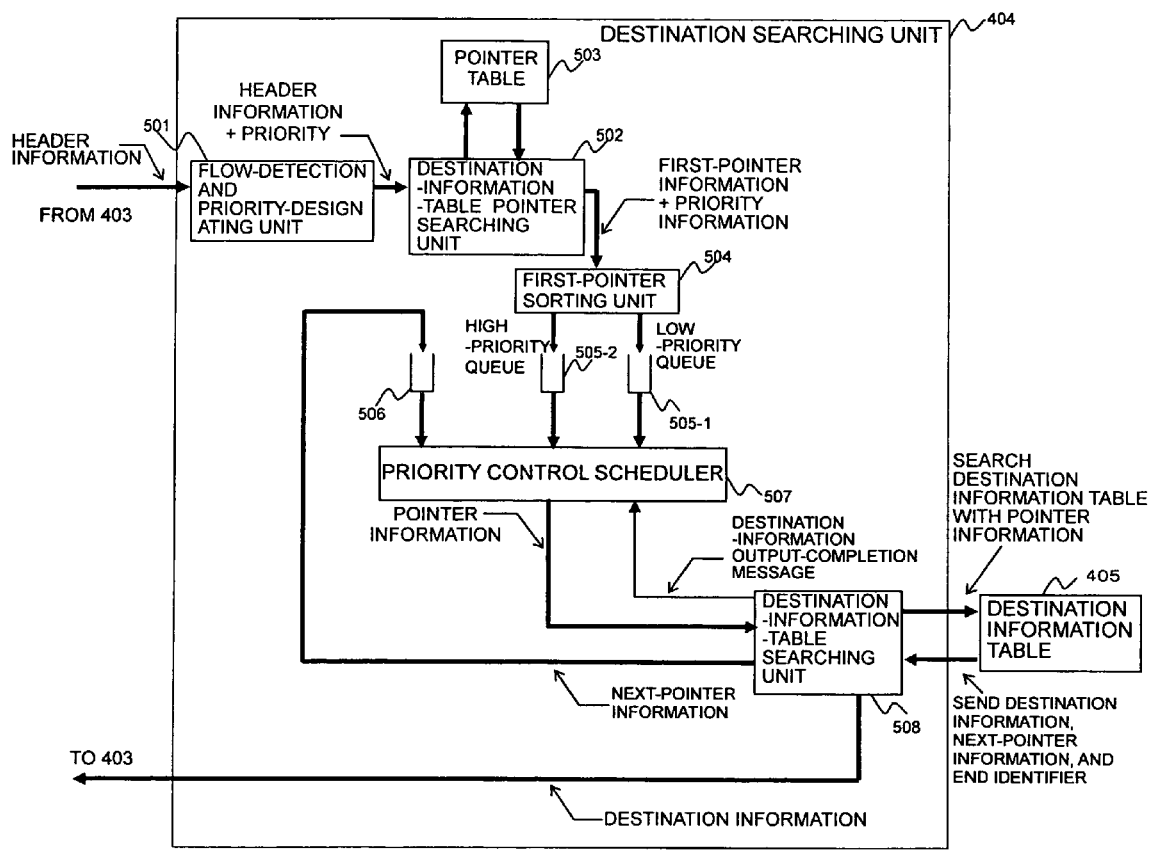
FIG. 5 is a diagram showing one example configuration of a first-pointer priority-control destination searching unit according to a first embodiment of the present invention.

FIG. 5 shows one configuration of the destination searching unit 404, which has first-pointer priority control, in the present embodiment.

The destination searching unit 404 includes, for example, a flow-detection and priority-designating unit 501, a destination-information-table pointer searching unit 502, a pointer table 503, a first-pointer sorting unit 504, a first-pointer low-priority queue 505-1, a first-pointer high-priority queue 505-2, a next-pointer queue 506, a priority control scheduler 507, and a destination-information-table searching unit 508.

The flow-detection and priority-designating unit 501 detects flows and designates a processing priority for each flow from combined packet information from the packet forwarding and duplicating unit 403. For example, the flow-detection and priority-designating unit 501 detects a VoIP flow from the combined packet information and designates a high priority for the VoIP flow. For example, it sets priority information to "high". The flow-detection and priority-designating unit 501 also detects a multicast flow from the combined packet information and designates a low priority for the multicast flow. For example, it sets the priority information to "low". In addition, the flow-detection and priority-designating unit 501 outputs the input header information and priority information to the destination-information-table pointer searching unit 502. In addition to VoIP packets, the flow-detection and priority-designating unit 501 may set the priority information to "high" for any audio packets. Alternatively, the priority information may be set to "high" or "low" for any packets. In the present embodiment, two priority levels are set, namely "high" and "low", but it is also possible that multiple priority levels are set, and packets are queued in multiple queues corresponding to the priority levels.

The destination-information-table pointer searching unit 502 searches a content addressable memory (CAM) or tree-structured data using the destination IP address in the packet header information as a key, refers to the pointer table 503 using the result of that search, and obtains first-pointer information for reading the destination information table 405. Then, the obtained first-pointer information and priority information are output to the first-pointer sorting unit 504.

The pointer table 503 stores pointer information for reading the destination information table 405. The destination IP address and first-pointer information are in one-to-one correspondence, for example, and therefore, if the destination IP address is determined, the pointer referring to the destination information table 405 is also determined. For example, for the destination IP address for a unicast packet, the pointer table 503 is configured so as to link to the pointer A in FIG. 16B. For the destination IP address for a multicast packet, the pointer table 503 is configured so as to link to the pointer B in FIG. 16C. The destination IP address and first-pointer information are not limited to a one-to-one correspondence; they may be in n-to-1 correspondence, so that if there are different destination IP addresses, they may specify the same pointer.

The first-pointer sorting unit 504 sorts the pointer information and the priority information into either the first-pointer low-priority queue 505-1 or the first-pointer high-priority queue 505-2 based on the priority level designated by the flow-detection and priority-designating unit 501. The priority information may be omitted.

The first-pointer low-priority queue 505-1 and the first-pointer high-priority queue 505-2 are low-priority and high-priority waiting queues, respectively, for holding the first-pointer information obtained by the destination-information-table pointer searching unit 502 and the priority information designated by the flow-detection and priority-designating unit 501. The priority information may be omitted. Also, the queues 505-1 and 505-2 each output an extraction request to the priority control scheduler 507, and the first-pointer information is extracted in an order determined by the priority control scheduler 507.

The first-pointer low-priority queue 505-1 holds the first-pointer information of packets designated to have low priority (for example, multicast packets) by the flow-detection and priority-designating unit 501. The first-pointer high-priority queue 505-2 holds first-pointer information of packets designated to have high priority (for example, VoIP packets) by the flow-detection and priority-designating unit 501.

The next-pointer queue 506 is a waiting queue for holding next-pointer information obtained by the destination-information-table searching unit 508. The next-pointer queue 506 outputs an extraction request to the priority control scheduler 507, and the next-pointer information is extracted in an order determined by the priority control scheduler 507.

The priority control scheduler (priority-control destination-information-table readout scheduler) 507 performs extraction scheduling according to the priority level, in response to the extraction requests from the first-pointer low-priority queue 505-1, the first-pointer high-priority queue 505-2, and the next-pointer queue 506. It extracts pointer information (first-pointer information or next-pointer information) from the respective queues according to the scheduling result and sends the pointer information to the destination-information-table searching unit 508. For example, the pointer information is extracted from the queues in the following order of priority: the next-pointer queue 506, the first-pointer high-priority queue 505-2, and the first-pointer low-priority queue 505-1. In order to preserve the processing order of the packets, once extraction from the first-pointer queues 505-1 and 505-2 is performed, it is possible to perform extraction from the next-pointer queue 506 only and extracting pointer information of the next packet from the first-pointer queues 505-1 and 505-2 is not performed until a message is received indicating that output of destination information from the destination-information-table searching unit 508 has ended. This extraction suspension control is performed independently of the priority level.

The destination-information-table searching unit 508 refers to the destination information table 405 according to the pointer information from the priority control scheduler 507 and obtains the corresponding destination information, next-pointer information, and end-of-destination-information identifier. Also, it outputs the destination information to the packet forwarding and duplicating unit 403 as the search result. At this stage, in the case of unicasting, the destination-information-table searching unit 508 obtains and outputs the output port number and next-hop IP address as the destination information, and in the case of multicasting, it obtains and outputs the output port numbers. It is determined whether to terminate outputting of destination information based on the end-of-destination-information identifier. If so (for example, when the end-of-destination-information identifier is "1"), a message indicating termination of outputting of destination information is sent to the priority control scheduler 507.

Conversely (for example, when the end-of-destination-information identifier is "0"), the next-pointer information is sent to the next-pointer queue 506.

Figure 6:
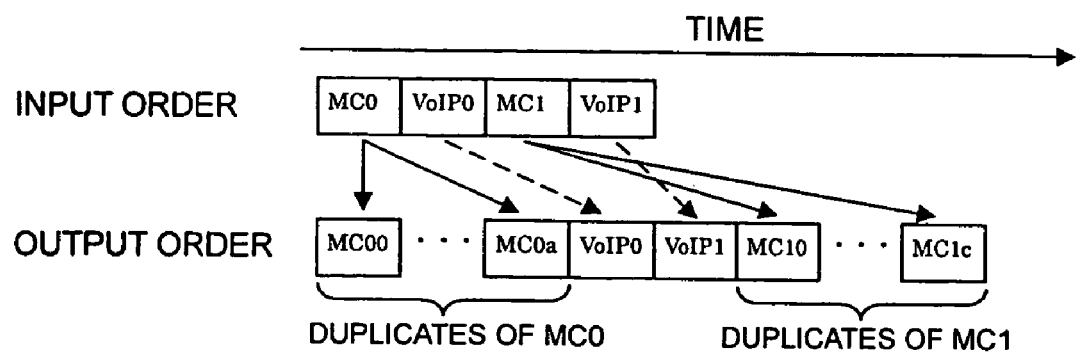
FIG. 6 is a diagram showing the output sequence of packets with first-pointer priority-control scheduling for low-priority multicast packets and high-priority VoIP packets.

FIG. 6 shows a packet output sequence with first-pointer priority control scheduling of low-priority multicast packets and high-priority VoIP packets.

For example, if packets are input in the sequence MC0, VoIP0, MC1, VoIP1, after MC0 is duplicated and output, VoIP0 is output. At this point, if MC1 and VoIP1 are held in the low-priority queue and the high-priority queue, respectively, VoIP1 is output first according to its priority level. Therefore, VoIP1 can be output without waiting for MC1 to be duplicated and output. For example, even if the number of multicast expansions is large, there is little effect on the VoIP packets.

1.2 Flowcharts

Figure 9:
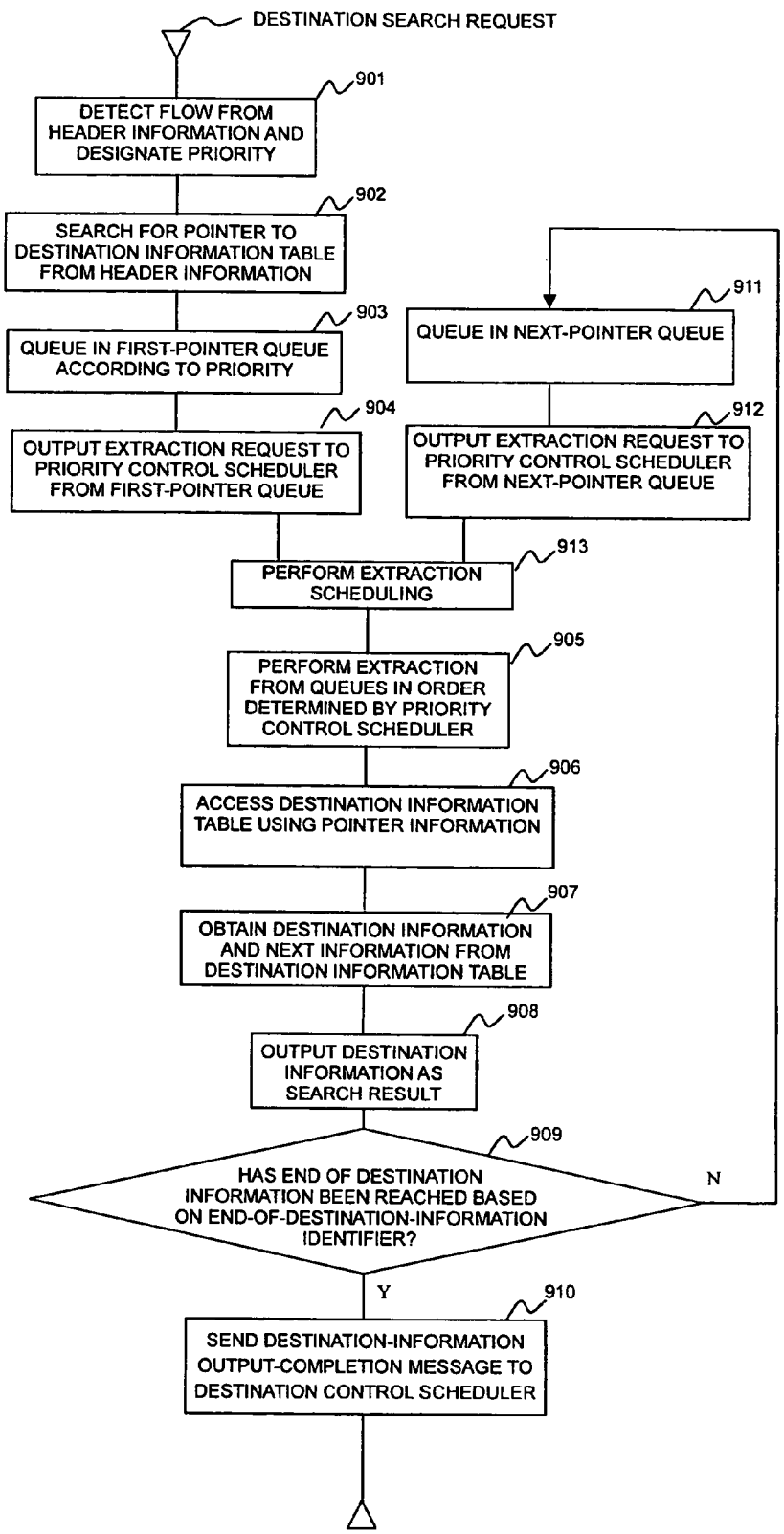
FIG. 9 is a flowchart showing destination searching with first-pointer priority-control executed by the destination searching unit.

FIG. 9 is a flowchart showing destination searching with the first-pointer priority control executed by the destination searching unit 404.

When a destination search request including packet header information is input to the destination searching unit 404 from the packet forwarding and duplicating unit 403, the processing described below is executed.

The flow-detection and priority-designating unit 501 detects a flow from the header information and designates a priority level (step 901). From the header information (for example, the destination IP address), the destination-information-table pointer searching unit 502 searches for a pointer to the destination information table (step 902). For example, it refers to the pointer table 503 to obtain first-pointer information corresponding to the destination IP address. The first-pointer sorting unit 504 queues the first-pointer information in the first-pointer queue corresponding to the priority level (step 903). When the pointer information is queued in the first-pointer low-priority queue 505-1 and the first-pointer high-priority queue 505-2, an extraction request is output to the priority control scheduler 507 (step 904). Next, the process proceeds to step 913.

In step 913, the priority-control scheduler 507 performs extraction scheduling. For example, among the next-pointer queue 506, the first-pointer low-priority queue 505-1, and the first-pointer high-priority queue 505-2, it is determined from which queue the pointer information is to be extracted. Details of this processing step are described later. The priority control scheduler 507 then extracts the pointer information from queues in the determined sequence (step 905). The extracted pointer information is then output to the destination-information-table searching unit 508.

The destination-information-table searching unit 508 accesses the destination information table 405 using the pointer information (step 906). The destination-information-table searching unit 508 obtains the destination information and/or the next-pointer information from the destination information table 405 (step 907). It also obtains the end-of-destination-information identifier. For example, in the case of pointer information for unicasting (for example, pointer A in FIG. 16B), an output port number "1" and a next-hop IP address "192.168.0.2" are obtained as the destination information, and an end-of-destination-information identifier "1" is obtained. On the other hand, in the case of pointer information for multicasting (for example, pointer B in FIG. 16C), an output port number "0" is obtained as the destination information, "next pointer 1" is obtained as the next-pointer information, and an end-of-destination-information identifier "0" is obtained. The destination-information-table searching unit 508 then outputs the destination information to the packet forwarding and duplicating unit 403 as a search result (step 908).

The destination-information-table searching unit 508 determines whether it has reached the end of the destination information based on the end-of-destination-information identifier (step 909). For example, if the end-of-destination-information identifier is "1", it determines that it has reached the end of the destination information. Conversely, if the end-of-destination-information identifier is "0", it determines that it has not reached the end of the destination information. The identifier may be any information other than these values. Also, any method may be used to determine whether the end of the destination information has been reached; it is not particularly limited. When the destination-information-table searching unit 508 determines that it has reached the end of the destination information (Yes in step 909), the process proceeds to step 910. On the other hand, when it determines that it has not reached the end of the destination information (No in step 909), the processing proceeds to step 911.

In step 910, the destination-information-table searching unit 508 sends to the priority control scheduler 507 a message indicating completion of outputting of destination information.

In step 911, the destination-information-table searching unit 508 queues the obtained next-pointer information in the next-pointer queue 506. The next-pointer queue 506 then outputs an extraction request to the priority control scheduler 507 (step 912). Then, the process proceeds to step 913, and the subsequent steps are executed. The pointer information queued in the next-pointer queue 506 is extracted with priority (for example, step 905), and the destination information table 405 is repeatedly searched according to the next-pointer information (for example, steps 906 and 907).

Figure 10:
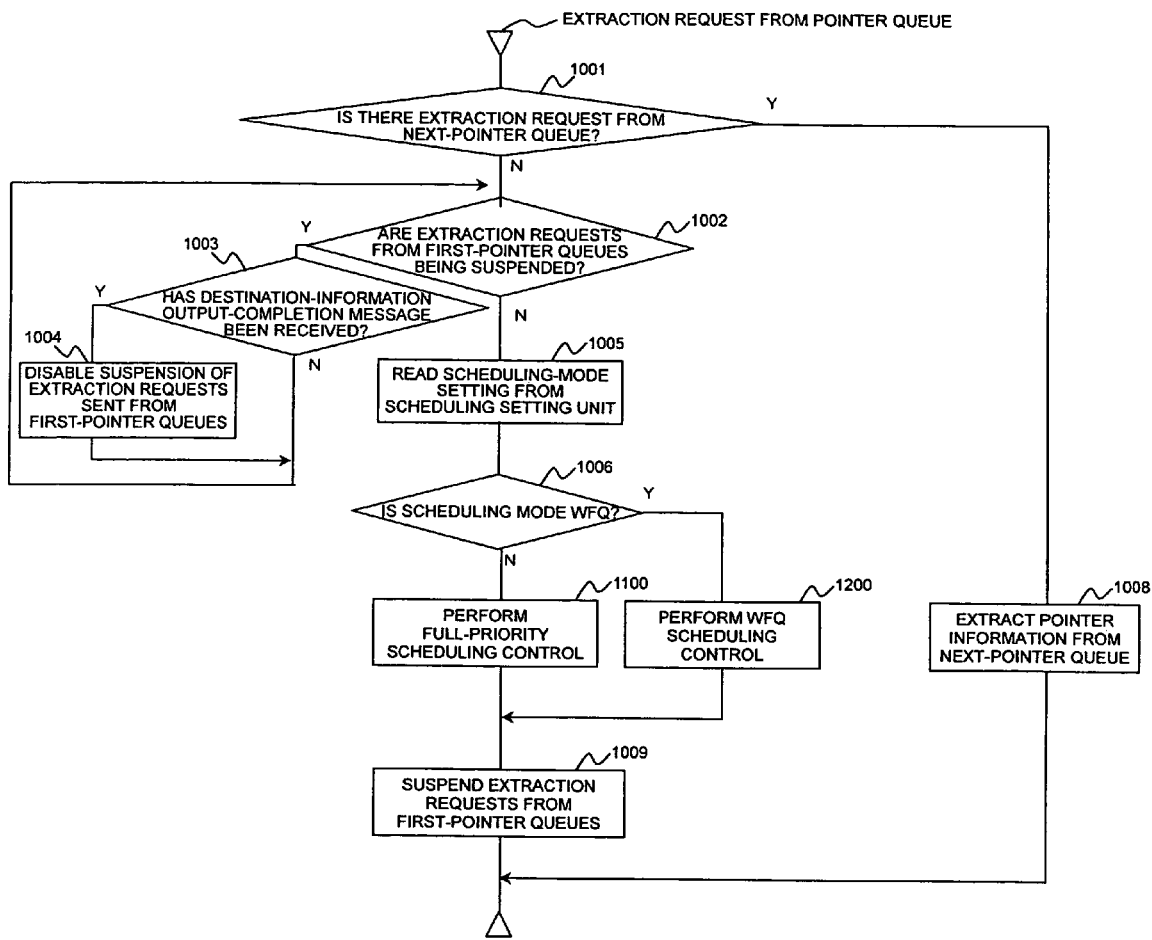
FIG. 10 is a flowchart showing details of the processing in step 913 shown in FIG. 9 (in the case of full-priority scheduling).

FIG. 10 is a detailed flowchart of processing in steps 913 and 905 shown in FIG. 9. Details of the processing performed by the priority control scheduler 507 in steps 913 and 905 will be described while referring to FIG. 10.

When an extraction request is input to the priority control scheduler 507 from a pointer queue, the following processing is executed. An extraction request is output, for example, from each of the first-pointer low-priority queue 505-1, the first-pointer high-priority queue 505-2, and the next-pointer queue 506 (corresponding to steps 904 and 912 in FIG. 9).

The priority control scheduler 507 determines whether there is an extraction request from the next-pointer queue 506 (step 1001). If there is an extraction request from the next-pointer queue 506 (Yes at step 1001), the priority control scheduler 507 extracts pointer information from the next-pointer queue 506 and outputs it to the destination-information-table searching unit 508 (step 1008). Thus, when the pointer information is queued in the next-pointer queue 506, an extraction request is output from the next-pointer queue 506, steps 1001 and 1008 are executed, and the pointer information is extracted from the next-pointer queue 506.

On the other hand, if there is no extraction request from the next-pointer queue 506 (No at step 1001), the priority control scheduler 507 determines whether extraction requests from the first-pointer queues 505-1 and 505-2 are being suspended (step 1002). This determination can be accomplished by, for example, referring to a flag indicating whether or not extraction is being suspended. This flag is initially set to "suspension disabled".

If extraction requests from the first-pointer queues 505 are being suspended (Yes at step 1002), the priority control scheduler 507 determines whether the message indicating the end of destination information outputting has been received (step 1003). If the priority control scheduler 507 determines that this message has been received (Yes at step 1003), it disables suspension of extraction requests from the first-pointer queues 505 (step 1004) and sets the flag to "suspension disabled", for example. Then, the processing proceeds to step 1002. On the other hand, if the message indicating the end of destination information outputting has not been received (No at step 1003), the processing proceeds to step 1002.

If extraction requests from the first-pointer queues 505 are not being suspended (No at step 1002), the priority control scheduler 507 reads out a scheduling-mode setting from the scheduling setting unit 409 (step 1005). The priority control scheduler 507 determines whether the read scheduling-mode setting indicates WFQ, for example (step 1006). If the scheduling-mode setting indicates WFQ (Yes at step 1006), the priority control scheduler 507 executes WFQ scheduling control and extracts pointer information from the first-pointer low-priority queue 505-1 or the first-pointer high-priority queue 505-2 (step 1200). On the other hand, if the scheduling-mode setting does not indicate WFQ (No at step 1006), the priority control scheduler 507 executes full-priority scheduling control and extracts pointer information from the first-pointer low-priority queue 505-1 or the first-pointer high-priority queue 505-2 (step 1100). Details of the full-priority scheduling control and the WFQ scheduling control are described later.

The priority control scheduler 507 then suspends extraction requests from the first-pointer queues 505 (step 1009). For example, the flag is set to "suspension enabled".

1.3 Full-priority Scheduling Control

Figure 17:
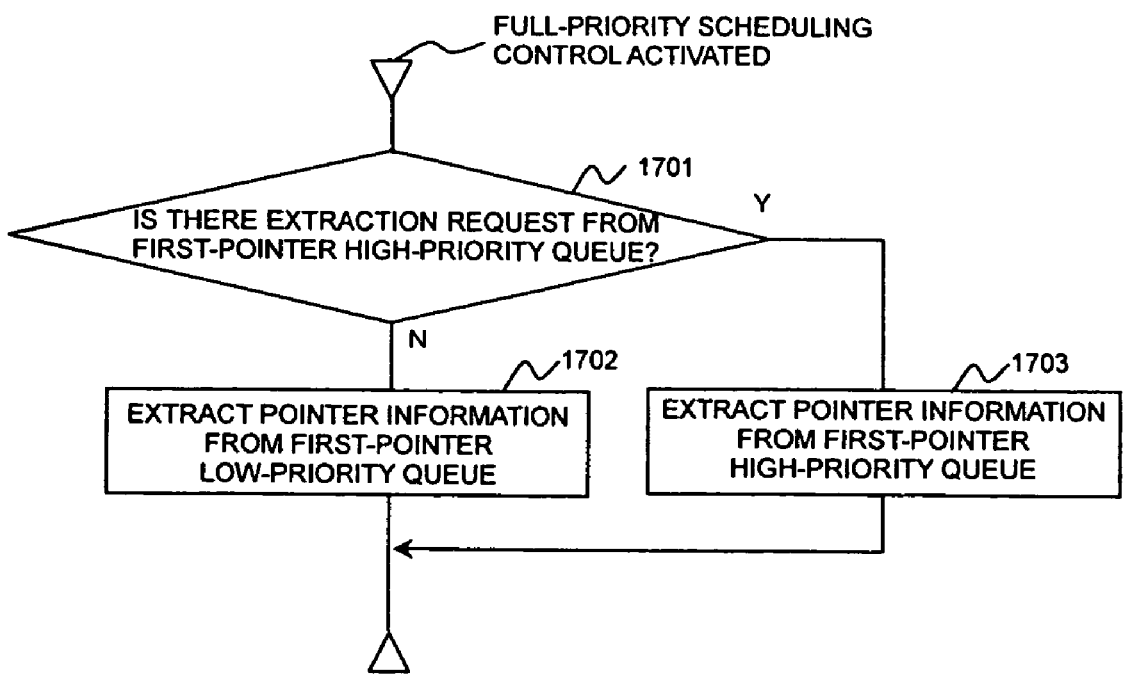
FIG. 17 is a flowchart showing details of the processing in step 1100 shown in FIG. 10 (full-priority scheduling).

FIG. 17 is a flowchart showing the full-priority scheduling control. Step 1100 mentioned above will be described with reference to FIG. 17.

First, when the full-priority scheduling control is activated, the priority control scheduler 507 determines whether there is an extraction request from the first-pointer high-priority queue 505-2 (step 1701). If there is no extraction request from the first-pointer high-priority queue 505-2 (No at step 1701), the priority control scheduler 507 extracts pointer information from the first-pointer low-priority queue 505-1 and outputs it to the destination-information-table searching unit 508 (step 1702). Then, the processing proceeds to step 1009.

On the other hand, if there is an extraction request from the first-pointer high-priority queue 505-2 (Yes at step 1701), the priority control scheduler 507 extracts pointer information from the first-pointer high-priority queue 505-2 and outputs it to the destination-information-table searching unit 508 (step 1703). Then, the processing proceeds to step 1009.

Operation Example

Figure 7:
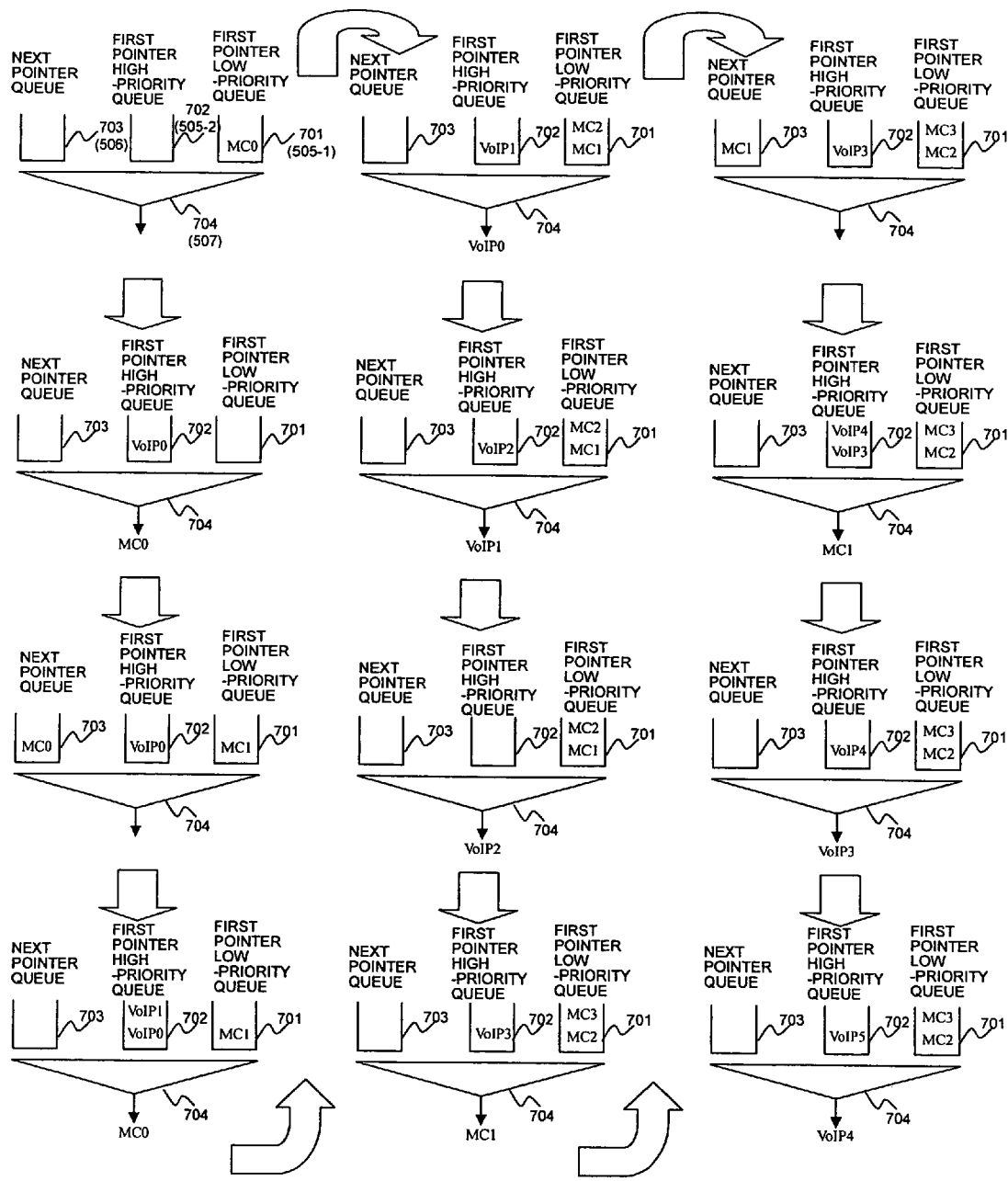
FIG. 7 is a diagram showing the flow of multicast packets in full-priority scheduling in destination-information-table readout first-pointer queues.

FIG. 7 shows the flow of multicast packets in full-priority scheduling in the destination-information-table readout first-pointer queues.

An illustrative example of the extraction of pointer information by the scheduler 507 will be described with reference to FIG. 7.

First, the left-hand column in the figure will be described. When there is a packet MC0 (at the first stage in the left column in the figure) in a low-priority queue 701 (corresponding to the queue 505-1 in FIG. 5), a scheduler 704 (corresponding to the priority control scheduler 507 in FIG. 5) extracts the packet MC0 (the second stage at the left). At this point, extraction from the low-priority queue 701 and a high-priority queue 702 is suspended. After searching for the destination of MC0, the next-pointer information is queued (the third stage at the left) in a next-pointer queue 703 (corresponding to the queue 506 in FIG. 5). Then, an extraction request is output from the next-pointer queue 703, and the scheduler 704 extracts MC0 from the next-pointer queue 703 with priority (the fourth stage at the left). Here, according to the destination search for MC0, a message indicating the end of destination information outputting is received from the destination-information-table searching unit 508, and suspension is disabled.

Next, the central column in the figure will be described. When MC0 is output, as in the fourth stage at the left, and each queue is in the state shown in the figure, the scheduler 704 extracts a VoIP0 from the high-priority queue 702 according to the priority level (the first stage in the center). Also, VoIP1 and VoIP2 are sequentially extracted in the same way (second and third stages in the center). When the VoIP packets have been output, and there is no pointer information in the high-priority queue 702, as in the third stage in the center, the scheduler 704 extracts MC1 from the low-priority queue 701 (fourth stage in the center).

Next, the right-hand column in FIG. 7 will be described. After searching for a destination for MC1, the next-pointer information is queued in the next-pointer queue 703 (first stage at the right). Then, an extraction request is output from the next-pointer queue 703, and the scheduler 704 extracts MC1 from the next-pointer queue 703 with priority (second stage at the right). When MC1 is output, as in the second stage at the right, and each queue is in the state shown in the figure, the scheduler 704 sequentially extracts VoIP3 and VoIP4 according to their priority levels (third and fourth stages at the right).

1.4 WFQ (Weighted Fair Queuing) Scheduling Control

Figure 18:
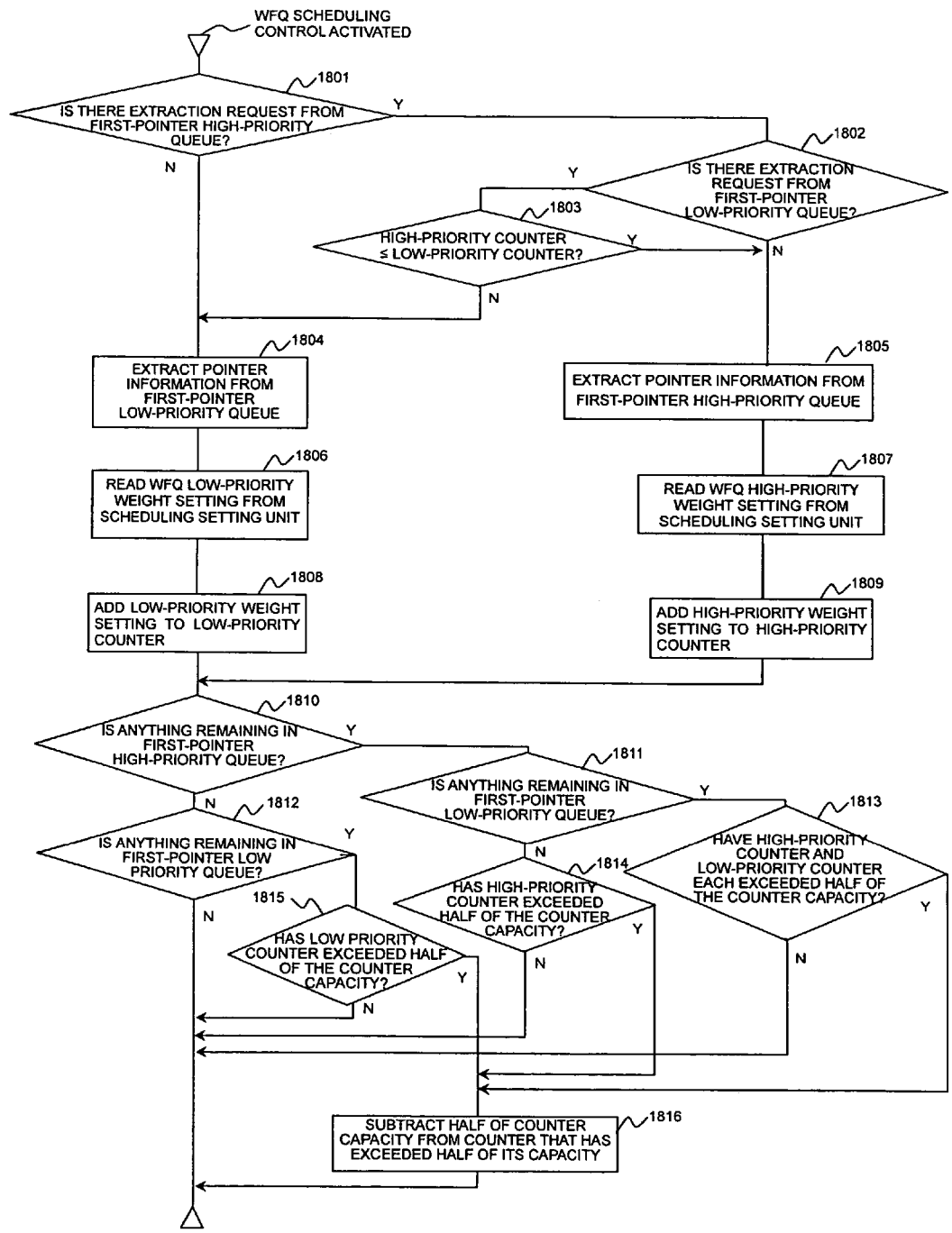
FIG. 18 is a flowchart showing details of the processing in step 1200 shown in FIG. 10 (WFQ scheduling).

FIG. 18 is a flowchart of the WFQ scheduling control. Step 1200 mentioned above will be described with reference to FIG. 18.

First, when WFQ scheduling is activated, the priority control scheduler 507 determines whether there is an extraction request from the first-pointer high-priority queue (step 1801). If there is an extraction request from the first-pointer high-priority queue (Yes at step 1801), the priority control scheduler 507 proceeds to step 1802. On the other hand, if there is no extraction request (No at step 1801), it proceeds to step 1804.

At step 1802, the priority control scheduler 507 determines whether there is an extraction request from the first-pointer low-priority queue (step 1802). If there is an extraction request from the first-pointer low-priority queue, the priority control scheduler 507 proceeds to step 1803. On the other hand, if there is no extraction request (No at step 1802), it proceeds to step 1805.

At step 1803, the priority control scheduler 507 determines whether a high-priority counter value is less than or equal to a low-priority counter value). If the high-priority counter value is less than or equal to the low-priority counter value (Yes at step 1803), the priority control scheduler 507 proceeds to step 1805, otherwise (No at step 1803) it proceeds to step 1804. If the high-priority counter value is equal to the low-priority counter value, the priority control scheduler 507 may proceed to step 1804 to extract the pointer information from the low-priority queue.

In step 1805, the priority control scheduler 507 extracts pointer information from the first-pointer high-priority queue. Then, the priority control scheduler 507 reads out a WFQ high-priority weight setting from the scheduling setting unit 409 (step 1807). The priority control scheduler 507 then adds the read WFQ high-priority weight setting to the high-priority counter (step 1809).

On the other hand, in step 1804, the priority control scheduler 507 extracts pointer information from the first-pointer low-priority queue. In this scheduling control process, even when there is an extraction request from the high-priority queue, if the high-priority counter value is greater than the low-priority counter value, pointer information is extracted from the low-priority counter. For example, not only high-priority packets, but also low-priority packets can be processed. For instance, even if many high-priority packets are input, it is possible to prevent low-priority packets from not being processed and becoming backlogged. Then, the priority control scheduler 507 reads out a WFQ low-priority weight setting from the scheduling setting unit 409 (step 1806). The priority control scheduler 507 then adds the low-priority weight setting to the low-priority counter (step 1808).

The WFQ high-priority weight setting and the WFQ low-priority weight setting can be the reciprocals of the corresponding terms of the ratio of the numbers of times pointer information is extracted from the high-priority and low-priority queues. For example, if the ratio of pointer information extracted from the high-priority queue and the low-priority queue is 2:1 (one extraction from the low-priority queue for two extractions from the high-priority queue), the weight settings are the reciprocals thereof, namely 1/2 and 1/1. As the ratio increases, the weight decreases. In a step for determining from which queue the pointer information is extracted (step 1803), the values in the counters are compared, and the queue having the smaller value is selected. The weight setting is added to the selected queue, the high-priority queue or the low-priority queue. As the weight decreases (as the ratio increases), the increment of the counter decreases and the queue with the smaller weight is likely to be selected. Instead of the behavior described above, the counter may count any value, such as the number of pointers extracted from the queue. The counter may count up or, for example, it may count down from a specified ratio. Alternatively, the counter may approach a specified ratio by using another method.

Next, the priority control scheduler 507 executes updating processing for preventing overflow of the counter (steps 1810 to 1816). These steps may be omitted, or another type of processing for preventing counter overflow may be executed.

The priority control scheduler 507 determines whether pointer information remains in the first-pointer high-priority queue (step 1810). If pointer information remains in the first-pointer high-priority queue (Yes at step 1810), the priority control scheduler 507 determines whether there is priority information in the first-pointer low-priority queue (step 1811). If there is pointer information in the first-pointer low-priority queue (Yes at step 1811), the priority control scheduler 507 determines whether the high-priority counter and the low-priority counter each exceed half of the counter capacity (step 1813). If the priority control scheduler 507 determines that the high-priority counter and the low-priority counter each exceed half of the counter capacity (Yes at step 1813), the processing proceeds to step 1816. Conversely, if they do not exceed half of the counter capacity (No at step 1813), the processing proceeds to step 1009 shown in FIG. 10.

If there is no pointer information remaining in the first-pointer low-priority queue (No at step 1811), the priority control scheduler 507 determines whether the high-priority counter exceeds half of the counter capacity (step 1814). If the priority control scheduler 507 determines that the high-priority counter exceeds half of the counter capacity (Yes at step 1814), the processing proceeds to step 1816. Conversely, if it does not exceed half of the counter capacity (No at step 1814), the processing proceeds to step 1009 shown in FIG. 10.

If there is no pointer information remaining in the first-pointer high-priority queue (No at step 1810), the priority control scheduler 507 determines whether pointer information remains in the first-pointer low-priority queue (step 1812). If there is pointer information remaining in the first-pointer low-priority queue (Yes at step 1812), the priority control scheduler 507 determines whether the low-priority counter exceeds half of the counter capacity (step 1815). If the priority control scheduler 507 determines that the low-priority counter exceeds half of the counter capacity (Yes at step 1815), the processing proceeds to step 1816. Conversely, if it does not exceed half of the counter capacity (No at step 1815), the processing proceeds to step 1009 shown in FIG. 10. If the priority control scheduler 507 determines that there is no pointer information remaining in the first-pointer low-priority queue (No at step 1812), the processing proceeds to step 1009 shown in FIG. 10.

At step 1816, the priority control scheduler 507 subtracts half of the counter capacity from the counter that exceeds half of the capacity.

In the processing described above, it is determined whether half of the counter capacity is exceeded. However, it is not limited to half, and any value may be used. Also, regarding the value that is subtracted from the counter, any value other than half of the counter capacity may be subtracted.

Operation Example

Figure 8:
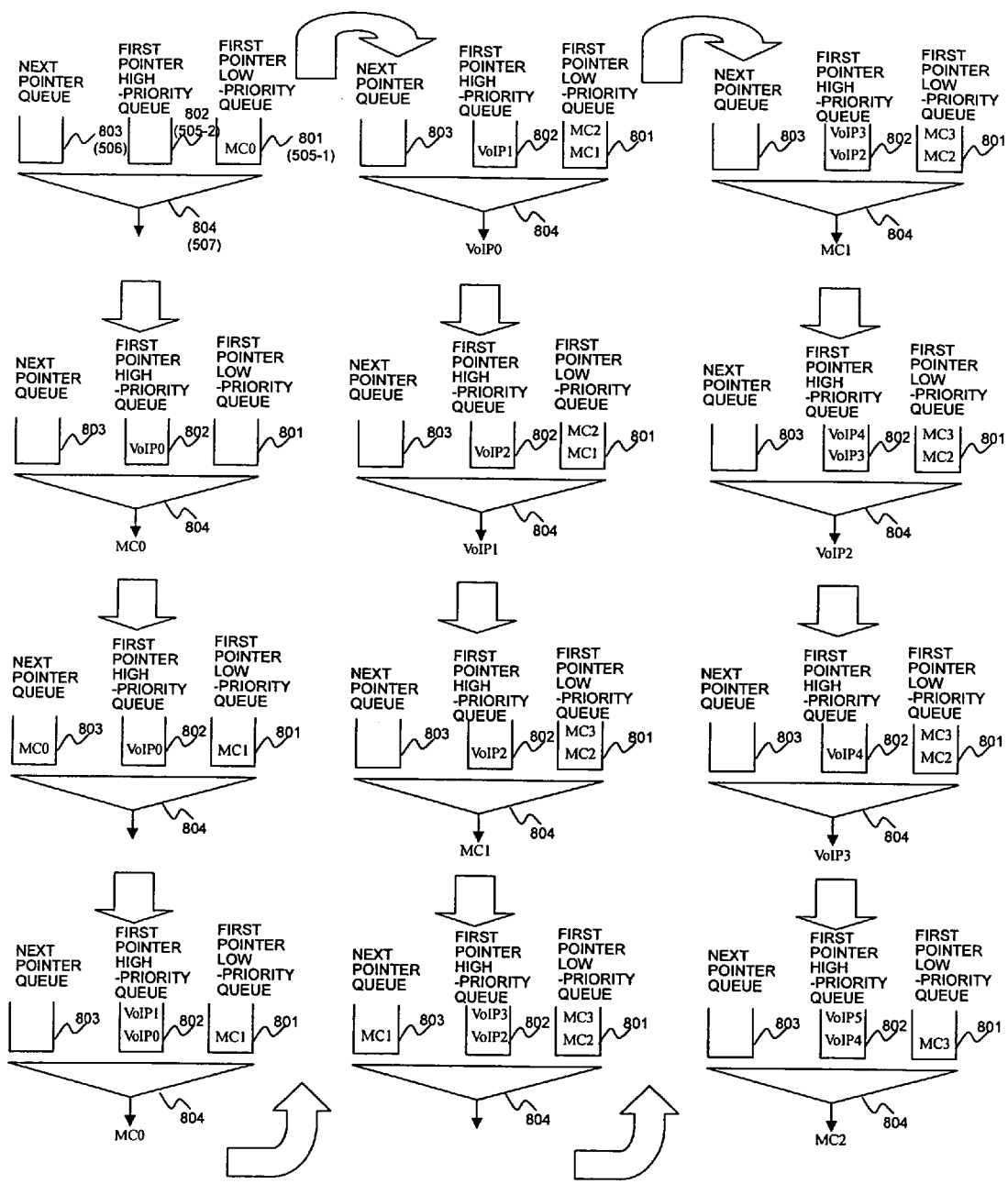
FIG. 8 is a diagram showing the flow of multicast packets in WFQ scheduling in the destination-information-table readout first-pointer queues.

FIG. 8 shows the flow of multicast packets in WFQ scheduling in the destination-information-table first-pointer queues. In FIG. 7, full-priority extraction from a higher-priority queue is always performed. On the other hand, in FIG. 8, extraction is performed using WFQ (weighted fair queuing) according to a specified ratio.

An illustrative example of the extraction of pointers by the scheduler 507 when executing WFQ scheduling control will be described with reference to FIG. 8. A high-priority counter and a low-priority counter are both initialized to "0". In this example, the ratio of high-priority extraction to low-priority extraction is 2:1. Therefore, according to the reciprocals of the corresponding terms of this ratio, the WFQ high-priority weight setting is 1/2 (0.5), and the WFQ low-priority weight setting is 1.

First, the left-hand column in the figure will be described. When MC0 (at the first stage in the left column in the figure) is in a low-priority queue 801 (corresponding to the queue 505-1 in FIG. 5), a scheduler 804 (corresponding to the priority control scheduler 507 in FIG. 5) extracts MC0 (the second stage at the left). A low-priority weight setting of 1 is added to the low-priority counter, and the counter value thus becomes 1. Extraction from the low-priority queue 801 and a high-priority queue 802 is suspended. After searching for the destination for MC0, next-pointer information is queued (the third stage at the left) in a next-pointer queue 803 (corresponding to the queue 506 in FIG. 5). Then, an extraction request is output from the next-pointer queue 803, and the scheduler 804 extracts MC0 from the next-pointer queue 803 (fourth stage at the left). Here, according to the destination search of MC0, a message indicating the end of destination information outputting is received from the destination-information-table searching unit 508, and suspension is disabled.

Next, the central column in the figure will be described. When MC0 is output, as in the fourth stage at the left, and each queue is in the state shown in the figure, since the value (0) of the high-priority counter is smaller than the value (1) of the low-priority counter (step 1803 described above), the scheduler 804 extracts VoIP0 from the high-priority queue 802 (the first stage in the center). The high-priority weight setting of 0.5 is added to the high-priority counter, and the counter value thus becomes 0.5. Since the high-priority counter value (0.5) is smaller than the low-priority counter value (1), the scheduler 804 extracts VoIP1 from the high-priority queue 802 (second stage in the center). The high-priority weight setting of 0.5 is added to the high-priority queue, and the counter value thus becomes 1.

In the state shown at the third stage in the center, the high-priority counter value (1) is the same as the low-priority counter value (1). In this example, when both counter values are the same, the scheduler 804 extracts MC1 from the low-priority queue 801 (third stage at the center). In other words, at step 1803 in FIG. 18, it is determined whether the value of the high-priority counter is less than the value of the low-priority counter. The low-priority weight setting of 1 is added to the low-priority counter, and the counter value thus becomes 2. If both counter values are the same, extraction may be performed from the high-priority queue. After the destination search of MC1, next-pointer information is queued in the next-pointer queue 803 (fourth stage in the center).

Next, the right-hand column in the figure will be described. An extraction request is output from the next-pointer queue 803, and the scheduler 804 extracts MC1 from the next-pointer queue 803 (first stage at the right). When MC1 is output, as shown in the first stage at the right, and each queue is in the state shown in the figure, since the high-priority queue value (1) is smaller than the low-priority queue value (2), the scheduler 804 extracts VoIP2 from the high-priority queue 802 (second stage at the right). The high-priority weight setting of 0.5 is added to the high-priority counter, and the counter value thus becomes 1.5. Similarly, the scheduler 804 then extracts VoIP3 from the high-priority queue 802 (third stage at the right). The high-priority counter value then becomes 2.

At the fourth stage at the right, the high-priority counter value (2) is the same as the low-priority counter value (2). In this example, the scheduler 804 extracts MC2 from the low-priority queue 801 (fourth stage at the left). When both counter values are the same, extraction may be performed from the high-priority queue 802.

2. Second Embodiment 2.1 Configuration of Apparatus

A router according to this embodiment has next-pointer queues with separate priority levels in a destination searching unit 4041. Units other than destination searching unit 4041 can be configured in the same way as those shown in FIG. 4.

Figure 11:
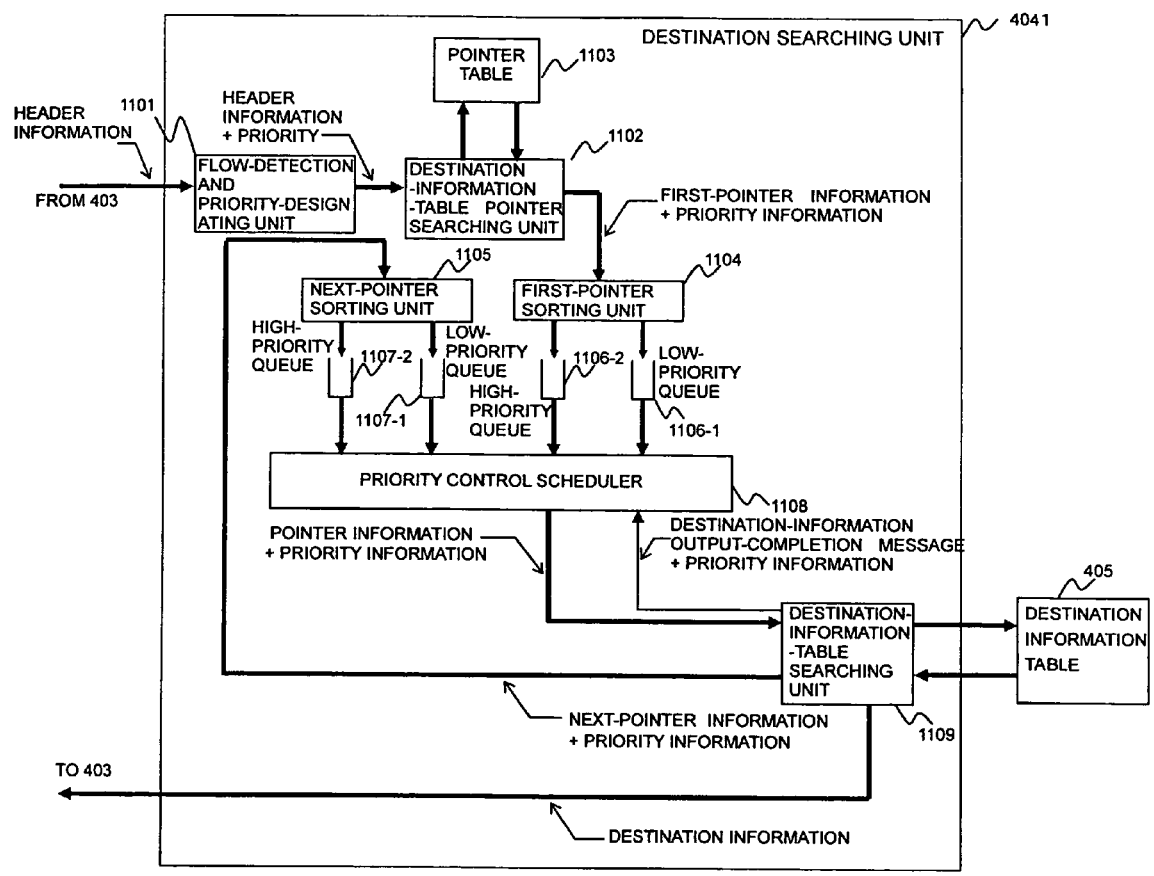
FIG. 11 shows one example configuration of a destination searching unit with first-pointer and next-pointer priority-control according to a second embodiment of the present invention.

FIG. 11 shows an example configuration of the destination searching unit 4041 with first-pointer and next-pointer priority control according to the second embodiment.

The destination searching unit 4041 includes a flow-detection and priority-designating unit 1101, a destination-information-table pointer searching unit 1102, a pointer table 1103, a first-pointer sorting unit 1104, a next-pointer sorting unit 1105, a first-pointer low-priority queue 1106-1, a first-pointer high-priority queue 1106-2, a next-pointer low-priority queue 1107-1, a next-pointer high-priority queue 1107-2, a priority control scheduler 1108, and a destination-information-table searching unit 1109.

The flow-detection and priority-designating unit 1101, detects a flow from combined packet header information sent from the packet forwarding and duplicating unit 403 and designates a priority level for processing in each flow. For example, when it detects a VoIP flow from the combined packet header information, it designates a high priority level for the VoIP flow. For example, priority information is set to "high". When it detects a multicast flow from the combined packet header information, it also designates a priority level depending on the content of multicasting. For example, for video, a high priority can be set (priority information is set to "high"), and for news, a low priority can be set (priority information is set to "low"). It can be determined whether the data is video or news by, for example, including an appropriate identifier in the packet header information and referring to this identifier. Although an example of a combination of video and news is given here, the designation of priority levels is not limited to this example, and any type of rule can be defined. Furthermore, the flow-detection and priority-designating unit 1101 outputs the input header information and the priority level information to the destination-information-table pointer searching unit 1102.

Because the destination-information-table pointer searching unit 1102 and the pointer table 1103 are the same as those in the first embodiment, described above, a description thereof is omitted here.

The first-pointer sorting unit 1104 sorts the pointer information and the priority information into either the first-pointer low-priority queue 1106-1 or the first-pointer high-priority queue 1106-2 according to the priority level designated by the flow-detection and priority-designating unit 1101.

The first-pointer low-priority queue 1106-1 and the first-pointer high-priority queue 1106-2 are waiting queues, for the respective priority levels, for holding the first-pointer information obtained by the destination-information-table pointer searching unit 1102 and the priority level information designated by the flow-detection and priority-designating unit 1101. The queues 1106-1 and 1106-2 each output an extraction request to the priority control scheduler 1108, and the first-pointer information is extracted in an order determined by the priority control scheduler 1108.

The first-pointer low-priority queue 1106-1 holds first-pointer information for packets with a low priority level, which is designated by the flow-detection and priority-designating unit 1101. The first-pointer high-priority queue 1106-2 holds first-pointer information for packets with a high priority level, which is designated by the flow-detection and priority-designating unit 1101. For example, among VoIP packets and multicast packets, packets having a high priority level, for example, video, are held in the first-pointer high-priority queue 1106-2. Only VoIP packets may be queued in the first-pointer high-priority queue 1106-2, and multicast packets may be queued in the first-pointer low-priority queue 1106-1 regardless of the priority levels set in the flow-detection and priority-designating unit 1101. Alternatively, it is possible to provide an additional queue to obtain a queue in which pointer information for VoIP packets is queued, a queue in which high-priority multicast packets are queued, and a queue in which low-priority multicast packets are queued.

The next-pointer sorting unit 1105 sorts the pointer information and the priority information into either the next-pointer low-priority queue 1107-1 and the next-pointer high-priority queue 1107-2 according to the priority level designated by the flow-detection and priority-designating unit 1101.

The next-pointer low-priority queue 1107-1 and the next-pointer high-priority queue 1107-2 are waiting queues for holding next-pointer information obtained by the destination-information-table searching unit 1109 and priority information designated by the flow-detection and priority-designating unit 1101. The queues 1107-1 and 1107-2 each output an extraction request to the priority control scheduler 1108, and extraction is preformed in an order determined by the priority control scheduler 1108.

The priority control scheduler 1108 (destination-information-table readout scheduler for priority control) performs extraction scheduling according to the priority levels in response to extraction requests from the first-pointer low-priority queue 1106-1, the first-pointer high-priority queue 1106-2, the next-pointer low-priority queue 1107-1, and the next-pointer high-priority queue 1107-2, and sends the pointer information and priority information to the destination-information-table searching unit 1109. For example, pointer information is extracted in the following order of priority: the next-pointer high-priority queue 1107-2, the first-pointer high-priority queue 1106-2, the next-pointer low-priority queue 1107-1, and the first-pointer low-priority queue 1106-1. In order to preserve the processing order of the packets, once extraction is performed from one of the first-pointer queues, until a message indicating completion of destination information outputting is received from the destination-information-table searching unit 1109, no pointer information and no priority information about the next packet is extracted from that queue, and instead, extraction is performed only from the next-pointer queues and the first-pointer queue with the other priority level. This extraction suspension control is carried out independently for each priority level.

The destination-information-table searching unit 1109 refers to a destination information table 405 according to the pointer information sent from the priority control scheduler 1108 and obtains destination information, next-pointer information, and an end-of-destination-information identifier. The destination-information-table searching unit 1109 also outputs the destination information to a packet forwarding and duplicating unit 403 as a search result. Here, in the case of unicasting, the destination-information-table searching unit 1109 outputs an output port number and a next-hop IP address as the destination information, and in the case of multicasting, it outputs output port numbers. It determines whether the outputting of destination information is completed based on the end-of-destination-information identifier in the next-pointer information, and if the outputting of destination information is completed (for example, if the end-of-destination-information identifier is "1"), it sends a message indicating completion of destination information outputting and the priority information to the priority control scheduler 1108. If the outputting of destination information is not yet completed, (for example, if the end-of-destination-information identifier is "0"), it sends the next-pointer information and the priority information to the next-pointer sorting unit 1105.

Figure 12:
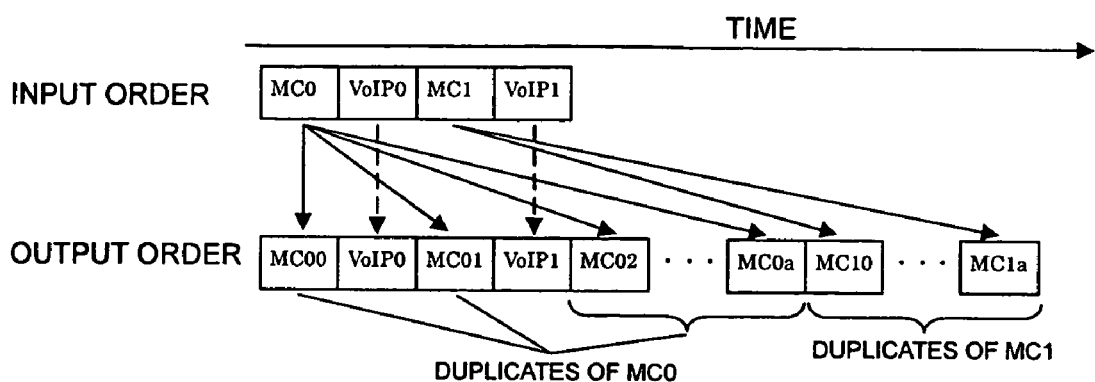
FIG. 12 is a diagram showing the output sequence of packets in the first-pointer and next-pointer priority-control scheduling for low-priority multicast packets and high-priority VoIP packets.

FIG. 12 is a diagram showing the output sequence of packets using the first-pointer and next-pointer priority control scheduling for low-priority multicasting packets and high-priority VoIP packets. For example, when packets MC0, VoIP0, MC1, and VoIP1 are input in this order, the destination of the low-priority MC0 packet is searched for, but before the next-pointer information is extracted from the queue, the high-priority VoIP0 packet is output. In this way, the high-priority VoIP packets can be output while the low-priority MC packets are duplicated.

2.2 Flowcharts

Figure 13:
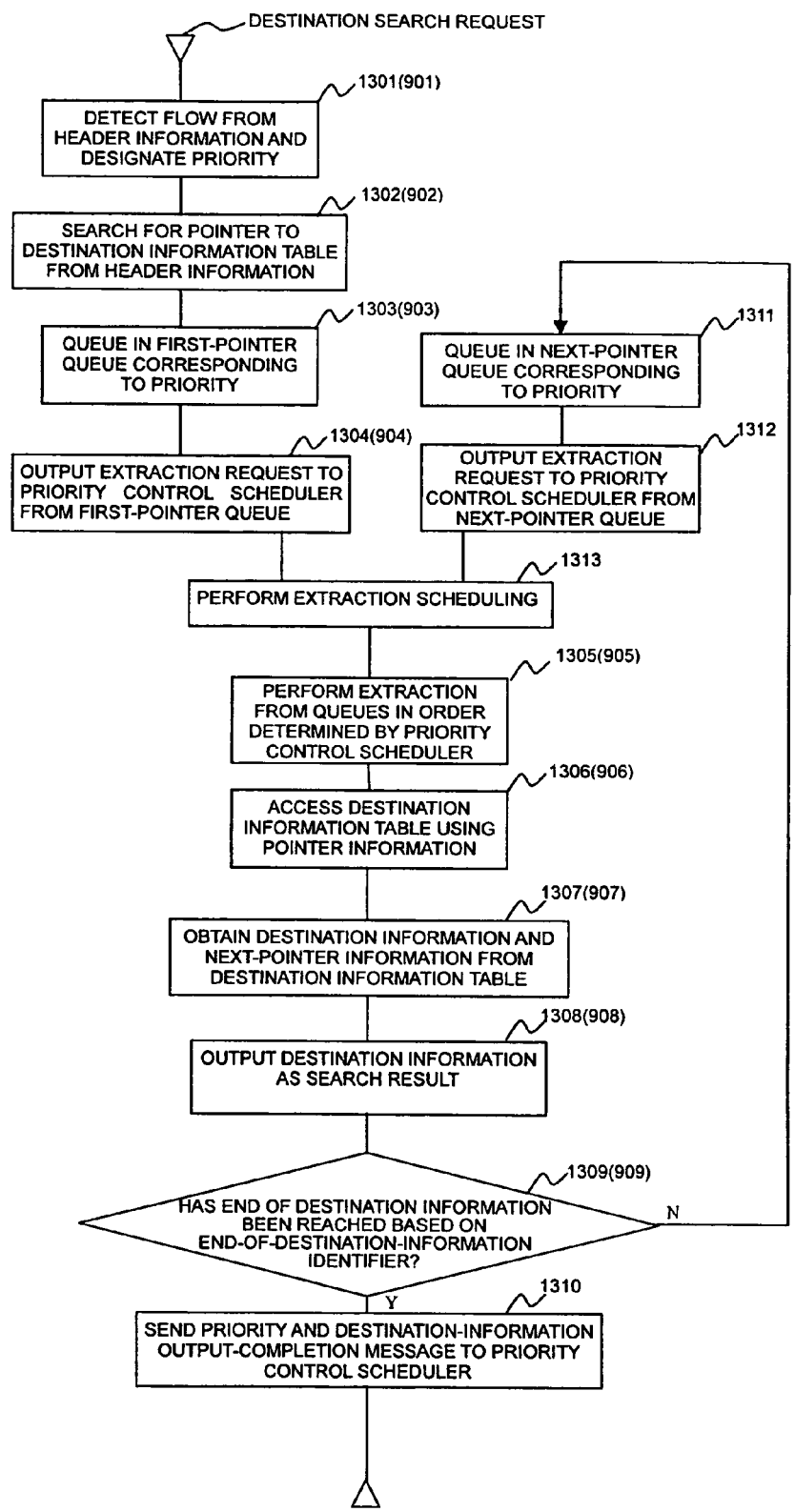
FIG. 13 is a flowchart showing destination searching with first-pointer and next-pointer priority-control.

FIG. 13 is a flowchart of destination searching with first-pointer and next-pointer priority control according to this embodiment.

When a destination search request including packet header information is input to the destination searching unit 4041 from the packet forwarding and duplicating unit 403, the following processing is executed. Reference numerals in parentheses in FIG. 13 represent corresponding steps in the first embodiment.

The flow-detection and priority-designating unit 1101 detects a flow from the header information and designates a priority level (step 1301). For example, the priority level is set to high for VoIP packets and multicast video packets, and the priority level is set to low for multicast news packets. The destination-information-table pointer searching unit 1102 then searches for a pointer to the destination information table from the header information (for example, a destination IP address) (step 1302). Then, the first-pointer sorting unit 1104 queues the pointer information in one of the first-pointer queues according to the priority level (step 1303). When the pointer information is queued, the corresponding queue, the first-pointer low-priority queue 1106-1 or the first-pointer high-priority queue 1106-2, outputs an extraction request to the priority control schedule 1108 (step 1304). Then, the process proceeds to 1313.

In step 1313, the priority control scheduler 1108 performs extraction scheduling. For example, it determines from which queue pointer information is extracted among the next-pointer low-priority queue 1107-1, the next-pointer high-priority queue 1107-2, the first-pointer low-priority queue 1106-1, and the first-pointer high-priority queue 1106-2. Details of this processing will be described later. The priority control scheduler 1108 then extracts the pointer information and the priority information from the queues in the order determined (step 1305). It also outputs the extracted pointer information and priority information to the destination-information-table searching unit 1109.

Steps 1306 to 1309 are the same as steps 906 to 909 in the first embodiment described above, and a description thereof shall thus be omitted here. When it is determined in step 1309 that the end of the destination information has been reached, the process proceeds to step 1310. Conversely, when it is determined that the end of the destination information has not been reached, the process proceeds to step 1311. In step 1310, the destination-information-table searching unit 1109 sends the priority information and a message indicating completion of destination information outputting to the priority control scheduler 1108 (step 1310).

In step 1311, the destination-information-table searching unit 1109 outputs the next-pointer information and priority information obtained in step 1307 to the next-pointer sorting unit 1105, and the next-pointer sorting unit 1105 queues the pointer information and priority information in the next-pointer queue corresponding to the priority level. When the pointer information is queued, the corresponding queue, the next-pointer high-priority queue 1107-2 or the next-pointer low-priority queue 1107-1, outputs an extraction request to the priority control scheduler 1108 (step 1312). Next, the process proceeds to step 1313 and the subsequent processing is executed.

Figure 14:
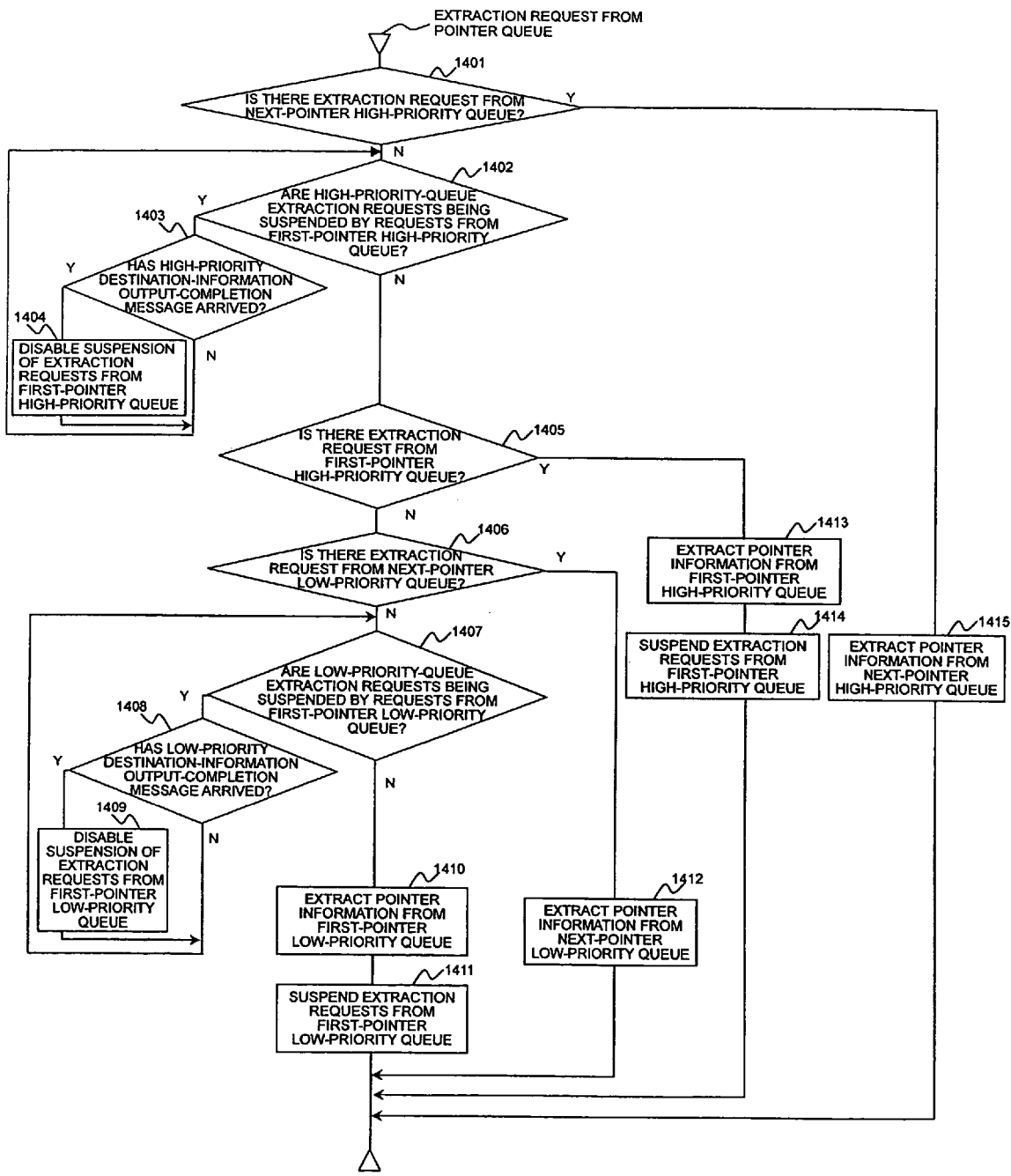
FIG. 14 is a flowchart showing destination-information-table-readout full-priority scheduling with the first-pointer and next-pointer priority-control.

FIG. 14 is a flowchart of full-priority destination-information-table readout scheduling with first-pointer and next-pointer priority control according to this embodiment. FIG. 14 shows details of the processing performed in steps 1313 and 1305 in FIG. 13 (in the case of full-priority scheduling). Details of the above-described processing performed by the priority control scheduler 1108 will be described with reference to FIG. 14.

When an extraction request is input from each of the pointer queues, the priority control scheduler 1108 executes the following processing. An extraction request is output from each queue (corresponding to steps 1304 and 1312 in FIG. 13).

The priority control scheduler 1108 determines whether there is an extraction request from the next-pointer high-priority queue 1107-2 (step 1401). If there is an extraction request from the next-pointer high-priority queue 1107-2 (Yes at step 1401), the priority control scheduler 1108 extracts the pointer information from the next-pointer high-priority queue 1107-2 and outputs it to the destination-information-table searching unit 1109 (step 1415). Then, the processing proceeds to step 1306 in FIG. 13.

On the other hand, if there is no extraction request from the next-pointer high-priority queue 1107-2 (No in step 1401), the priority control scheduler 1108 determines whether extraction requests from the first-pointer high-priority queue 1106-2 are being suspended (step 1402). In this embodiment, extraction requests are suspended for each priority level. This can be determined by, for example, referring to a suspension flag for each priority level indicating whether or not extraction is being suspended. This suspension flag is initially set to "suspension disabled", for example.

If extraction requests from the first-pointer high-priority queue 1106-2 are being suspended (Yes at step 1402), the priority control scheduler 1108 determines whether high-priority priority information and a message indicating the completion of destination information outputting have been received from the destination-information-table searching unit 1109 (step 1403). If high-priority priority information and a message indicating the completion of destination information outputting have been received (Yes at step 1403), the priority control scheduler 1108 disables the suspension of extraction requests from the first-pointer high-priority queue 1106-2 (step 1404). For example, it sets the high-priority flag to "suspension disabled". Then, the processing proceeds to step 1402. On the other hand, if the priority control scheduler 1108 determines that high-priority priority information and a message indicating the completion of destination information outputting have not been received (No as step 1403), the processing proceeds to step 1402.

If extraction requests from the first-pointer high-priority queue 1106-2 are not being suspended (No at step 1402), the priority control scheduler 1108 determines whether there is an extraction request from the first-pointer high-priority queue 1106-2 (step 1405). If there is an extraction request from the first-pointer high-priority queue 1106-2 (Yes at step 1405), the priority control scheduler 1108 extracts the pointer information from the first-pointer high-priority queue 1106-2 and outputs it to the destination-information-table searching unit 1109 (step 1413). Then, the priority control scheduler 1108 suspends extraction requests from the first-pointer high-priority queue 1106-1 (step 1414). For example, it sets the high-priority suspension flag to "suspension enabled". Then, the processing proceeds to step 1306 shown in FIG. 13.

If there is no extraction request from the first-pointer high-priority queue 1106-1 (No at step 1405), the priority control scheduler 1108 determines whether there is an extraction request from the next-pointer low-priority queue 1107-1 (step 1406). If there is an extraction request from the next-pointer low-priority queue 1107-1 (Yes at step 1406), the priority control scheduler 1108 extracts the pointer information from the next-pointer low-priority queue 1107-1 and outputs it to the destination-information-table searching unit 1109 (step 1412). Then, the processing proceeds to step 1306 in FIG. 13.

On the other hand, if there is no extraction request from the next-pointer low-priority queue 1107-1 (No at step 1406), the priority control scheduler 1108 determines whether extraction requests from the first-pointer low-priority queue 1106-1 are being suspended (step 1407). This can be determined by, for example, referring to a low-priority suspension flag indicating whether extraction is being suspended.

If extraction requests from the first-pointer low-priority queue 1106-1 are being suspended (Yes at step 1407), the priority control scheduler 1108 determines whether low-priority priority information and a message indicating the completion of destination information outputting have been received from the destination-information-table searching unit 1109 (step 1408). If low-priority priority information and a message indicating completion of destination information outputting have been received (Yes at step 1408), the priority control scheduler 1108 disables the suspension of extraction requests from the first-pointer low-priority queue 1106-1 (step 1409). For example, it sets the low-priority suspension flag to "suspension disabled". Then, the processing proceeds to step 1407. On the other hand, if the priority control scheduler 1108 determines that low-priority priority information and a message indicating completion of destination information outputting have not been received (No at step 1408), the processing proceeds to step 1407.

If extraction requests from the first-pointer low-priority queue 1106-1 are not being suspended (No at step 1407), the priority control schedule 1108 extracts the pointer information from the first-pointer low-priority queue 1106-1 and outputs it to the destination-information-table searching unit 1109 (step 1410). The priority control scheduler 1108 then suspends extraction requests from the first-pointer low-priority queue 1106-1 (step 1411). For example, it sets the low-priority suspension flag to "suspension enabled". Then, the processing proceeds to step 1306 shown in FIG. 13.

Although full-priority scheduling has been described in this embodiment, WFQ scheduling may be used, as described in the first embodiment.

The present embodiment is applicable, for example, to industries related to apparatuses, systems, and services for packet communication. Also, the present embodiment is applicable to services delivered over IP networks, such as video distribution services and VoIP telephone services where real-time performance is important.

The present embodiment also includes a multicast expansion method having the following steps:

(1) A step of designating priority information based on header information in an input unicast packet or multicast packet.

(2) A step of referring to a pointer table in which a destination address and first pointer information for referring to a destination information table are associated and stored, based on the destination address of the packet, to obtain corresponding first pointer information.

(3) A step of sorting the obtained first pointer information into a high-priority queue in which first pointer information of high-priority packets is held and a low-priority queue in which first pointer information for low-priority packets is held, according to the designated priority information.

(4) A step of extracting the first pointer information or i-th next-pointer information from each queue in the order of priority of a next queue, the high-priority queue, and the low-priority queue, the next queue holding the i-th (where i is an integer of 1 or more) next-pointer information for searching for another output destination of the packet.

(5) A step of, from a destination information table where output-port information of the packet and first next-pointer information or a next-hop address for searching for other output-port information of the packet are stored in association with the first-pointer information corresponding to the destination address of the packet; the other output-port information and (i+1)-th next-pointer information for searching for yet other output-port information are stored in association with the i-th (where i is an integer of 1 or more) next-pointer information; and the output-port information corresponding to the first-pointer information and the i-th next-pointer information are sequentially read out to search for a plurality of output destinations of a multicast packet, obtaining the output-port information and the next-hop address corresponding to the first-pointer information or the i-th next-pointer information, or the output-port information and the first or (i+1)-th next-pointer information.

(6) A step of outputting the first or (i+1)-th next-pointer information to the next queue.

(7) A step of outputting the input unicast packet or duplicating and outputting the input multicast packet according to the destination information including the output-port information and/or the next-hop address.

What is claimed is:

1. A packet forwarding apparatus comprising:
   an input unit for inputting a unicast packet and a multicast packet;
   a destination information table for
      storing output-port information of a packet which includes the unicast packet and the multicast packet and a next-hop address or first next-pointer information for searching for other output-port information of the packet, in association with first-pointer information corresponding to a destination address of the packet, and
      storing said other output-port information and (i+1)-th next-pointer information for searching for yet other output-port information, in association with i-th next-pointer information, where i is an integer of 1 or more,
      where the output-port information corresponding to the first-pointer information and the i-th next-pointer information is sequentially read out to search for a plurality of output destinations of the multicast packet;
   a destination searching unit for searching the destination information table to obtain one or a plurality of output-port information items and/or next-hop addresses;
   a packet forwarding and duplicating unit for outputting the input unicast packet and for duplicating and outputting the input multicast packet according to destination information which includes the output-port information and/or the next-hop address obtained by the destination searching unit;
   a switch for switching the unicast packet and the multicast packet output from the packet forwarding and duplicating unit, according to the destination information; and
   an output unit for outputting the packet switched by the switch,
   wherein the destination searching unit comprises
      a priority-designating unit for designating priority information based on header information in the packet input via the input unit;
      a pointer table in which the destination address and the first-pointer information are stored in association with each other;
      a pointer searching unit for referring to the pointer table based on the destination address of the packet to obtain the corresponding first-pointer information;
      a high-priority queue for holding the first-pointer information of a high-priority packet;
      a low-priority queue for holding the first-pointer information of a low-priority packet;
      a sorting unit for sorting the first pointer information obtained by the pointer searching unit into the high-priority queue and the low-priority queue according to the priority information specified by the priority-designating unit;
      a next queue for holding the i-th next-pointer information;
      a scheduler for extracting and outputting the first-pointer information or the i-th next-pointer information from each queue in the order of priority of the next queue, the high-priority queue, and the low-priority queue; and
      a destination-information-table searching unit for
         obtaining, from the destination information table, either the output-port information and the next-hop address, or the output-port information and the first or (i+1)-th next-pointer information based on the first-pointer information or i-th next-pointer information from the scheduler,
         outputting the output-port information and/or the next-hop address to the packet forwarding and duplicating unit, and
         outputting the first or (i+1)-th next-pointer address to the next queue.

2. The packet forwarding apparatus according to claim 1, wherein:
   the destination information table further stores an end-of-destination-information identifier indicating the existence of said other output-port information to be searched for, in association with the first-pointer information or the i-th next-pointer information;
   when the scheduler extracts the first-pointer information from the high-priority queue or the low-priority queue, the scheduler suspends extraction from the high-priority queue and the low-priority queue, and extracts the i-th next-pointer information from the next queue;
   the destination-information-table searching unit obtains the end-of destination-information identifier corresponding to the first-pointer information or the i-th next-pointer information from the destination information table and sends a completion message to the scheduler when the identifier indicates there is no said other output-port information; and
   the scheduler disables the suspension of extraction when the completion message is input thereto.

3. The packet forwarding apparatus according to claim 1, wherein the priority-designating unit designates the priority information based on the input header information such that a priority level for the multicast packet is low and a priority level for a voice-transmission packet, including a VoIP packet, is high.

4. The packet forwarding apparatus according to claim 1, wherein the scheduler:
   extracts the i-th next-pointer information from the next queue when the i-th next-pointer information is held in the next queue;
   extracts the first-pointer information from the high-priority queue when the i-the next-pointer information is not held in the next queue and when the first-pointer information is held in the high-priority queue; and
   extracts the first-pointer information from the low-priority queue when the i-th next-pointer information is not held in the next queue and when the first-pointer information is not held in the high-priority queue.

5. The packet forwarding apparatus according to claim 1, further comprising:

a storage unit in which a ratio of the number of first-pointer information items extracted from the high-priority queue and the number of first-pointer information items extracted from the low-priority queue is set and stored;

a first counter for counting the number of pointer information items extracted from the high-priority queue or a value related to that number; and a second counter for counting the number of pointer information items extracted from the low-priority queue or a value related to that number, wherein the scheduler extracts the i-th next-pointer information from the next queue when the i-th next-pointer information is held in the next queue, and when the i-th next-pointer information is not held in the next queue, extracts the first-pointer information from the high-priority queue or the low-priority queue by referring to the value of the first counter and the value of the second counter, such that the numbers of pointer information items extracted from the high-priority queue and the low-priority queue satisfy the ratio set in the storage unit.

6. A packet forwarding apparatus comprising:

an input unit for inputting a unicast packet and a multicast packet;

a destination information table for storing output-port information of a packet which includes the unicast packet and the multicast packet and a next-hop address or first next-pointer information for searching for other output-port information of the packet, in association with first-pointer information corresponding to a destination address of the packet, and storing said output-port information and (i+1)-th next-pointer information for searching for yet other output-port information, in association with i-th next-pointer information, where i is an integer of 1 or more, where the output-port information corresponding to the first-pointer information and the i-th next-pointer information is sequentially read out to search for a plurality of output destinations of the multicast packet;

a destination searching unit for searching the destination information table to obtain one or a plurality of output-port information items and/or next-hop addresses;

a packet forwarding and duplicating unit for outputting the input unicast packet and for duplicating and outputting the input multicast packet according to destination information which includes the output-port information and/or the next-hop address obtained by the destination searching unit;

a switch for switching the unicast packet and the multicast packet output from the packet forwarding and duplicating unit, according to the destination information; and an output unit for outputting the packet switched by the switch, wherein the destination searching unit comprises a priority-designating unit for designating priority information based on header information in the packet input via the input unit;

a pointer table in which the destination address and the first-pointer information are stored in association with each other;

a pointer searching unit for referring to the pointer table based on the destination address of the packet to obtain the corresponding first-pointer information;

a first high-priority queue for holding first-pointer information and priority information of a high-priority packet;

a first low-priority queue for holding first-pointer information and priority information of a low-priority packet;

a first sorting unit for sorting the first-pointer information searched by the pointer searching unit and the priority information designated by the priority-designating unit into the first high-priority queue and the first low-priority queue according to the priority information;

a second high-priority queue for holding i-th next-pointer information and priority information of a high-priority packet;

a second low-priority queue for holding i-th next-pointer information and priority information of a low-priority packet;

a second sorting unit for sorting the i-th next-pointer information and the priority information into the second high-priority queue and the second low-priority queue according to the priority information;

a scheduler for extracting either the first-pointer information or the i-th next-pointer information, and the priority information from the first high-priority queue, the first low-priority queue, the second high-priority queue, and the second low-priority queue in a predetermined order of priority, and for outputting the pointer information and the priority information; and a destination-information-table searching unit for inputting either the first-pointer information or the i-th next-pointer information, and the priority information from the scheduler, obtaining, from the destination information table, the output-port information and the next-hop address, or obtaining the output-port information and the first or (i+1)-th next-pointer information, based on the first-pointer information or the i-th next-pointer information, outputting the output-port information and/or the next-hop address to the packet forwarding and duplicating unit, and outputting the first or (i+1)-th next-pointer information and the priority information to the second sorting unit.

7. The packet forwarding apparatus according to claim 6, wherein the scheduler extracts the first-pointer information or the i-th next-pointer information in the order of priority of the second high-priority queue, the first high-priority queue, the second low-priority queue, and the first low-priority queue.

8. The packet forwarding apparatus according to claim 6, wherein the priority-designating unit designates the priority information based on the input header information such that a priority level for a voice packet, including a VoIP packet, is high.

9. The packet forwarding apparatus according to claim 6, wherein the priority-designating unit designates the priority information based on the input header information such that a priority level for a multicast video packet is high, and a priority level for a multicast news packet is low.

10. The packet forwarding apparatus according to claim 6, wherein:

the destination information table further stores an end-of-destination-information identifier indicating the existence of said other output-port information to be searched for, in association with the first-pointer information or the i-th next-pointer information;

the scheduler suspends extraction from the first high-priority queue once the first-pointer information is extracted from the first high-priority queue;

the scheduler suspends extraction from the first low-priority queue once the first-pointer information is extracted from the first low-priority queue;

the destination-information-table searching unit obtains the end-of-destination-information identifier corresponding to the first-pointer information or the i-th next-pointer information from the destination information table, and outputs a completion message and the input priority information to the scheduler when the identifier indicates that there is no said other output-port information; and the scheduler disables the suspension of extraction of the first high-priority queue or the first low-priority queue, corresponding to the priority information, when the completion message and the priority information are input thereto.

11. A packet forwarding apparatus for receiving a packet, searching for a destination, and transmitting the packet to the destination found by the searching, comprising:

a receiving unit for receiving a multicast packet and a unicast packet;

a priority-designating unit for designating a priority level for the unicast packet received at the receiving unit;

a destination searching unit for searching for a single item of destination information for the unicast packet received at the receiving unit and a plurality of items of destination information for the multicast packet received at the receiving unit;

a priority control unit for, when a predetermined priority level or higher is designated for the unicast packet by the priority-designating unit, making the destination searching unit:

first search for a part of the plurality of items of destination information corresponding to the multicast packet, secondly search for the destination information of the unicast packet, and then thirdly search for not-yet-searched destination information among the plurality of items of destination information corresponding to the multicast packet;

a first queue for storing the multicast packet and the unicast packet which are sent to the destination searching unit; and a next queue for storing the multicast packet after the destination searching unit searches for one of the plurality of items of destination information corresponding to the multicast packet sent from the first queue to the destination searching unit.

12. The packet forwarding apparatus according to claim 11, wherein the first queue includes a high-priority first queue for storing the unicast packet when the priority level thereof is at least the predetermined priority level designated by the priority-designating unit, and a low-priority first queue for storing the unicast packet when the priority level thereof is less than the predetermined priority level designated by the priority-designating unit.

13. The packet forwarding apparatus according to claim 12, wherein, when the unicast packet is stored in the high-priority first queue, the priority control unit obtains the unicast packet before the multicast packet stored in the next queue and sends the unicast packet to the destination searching unit.

14. The packet forwarding apparatus according to claim 12, wherein, when the unicast packet stored in the high-priority first queue is sent to the destination searching unit before the multicast packet stored in the next queue, the priority control unit increases the priority level of the multicast packet stored in the next queue.

15. The packet forwarding apparatus according to claim 11, wherein the priority-designating unit designates a priority level for the multicast packet received at the receiving unit; and the next queue includes a high-priority next queue for storing the multicast packet when the priority level thereof is at least the predetermined priority level designated by the priority-designating unit, and a low-priority next queue for storing the multicast packet when the priority level thereof is less than the predetermined priority level designated by the priority-designating unit.

16. The packet forwarding apparatus according to claim 15, wherein, when the unicast packet is stored in the high-priority first queue, the priority control unit obtains the unicast packet before the multicast packet stored in the low-priority next queue and sends the unicast packet to the destination searching unit.

* * * * *